US009569507B2

(12) United States Patent
Gopalan et al.

(10) Patent No.: US 9,569,507 B2
(45) Date of Patent: Feb. 14, 2017

(54) VIRTUAL DIRECTORY SERVER TO PROCESS DIRECTORY REQUESTS WHEN INFORMATION ON AN OBJECT IS SPLIT ACROSS MULTIPLE DATA SOURCES

(71) Applicant: Oracle International Corporation, Redwood Shores, CA (US)

(72) Inventors: Krithiga Gopalan, Singapore (IN); Mohamad Raja Gani Mohamad Abdul, Madurai (IN)

(73) Assignee: Oracle International Corporation, Redwood Shores, CA (US)

( * ) Notice: Subject to any disclaimer, the term of this patent is extended or adjusted under 35 U.S.C. 154(b) by 570 days.

(21) Appl. No.: 14/067,984

(22) Filed: Oct. 31, 2013

(65) Prior Publication Data

US 2015/0120776 A1    Apr. 30, 2015

(51) Int. Cl.
*G06F 17/30* (2006.01)

(52) U.S. Cl.
CPC ................. *G06F 17/30545* (2013.01)

(58) Field of Classification Search
CPC .................................................. Y10S 707/954
USPC ................................................. 707/769, 831
See application file for complete search history.

(56) References Cited

U.S. PATENT DOCUMENTS

| 4,945,475 | A  | 7/1990  | Bruffey et al.      |
|-----------|-----|---------|---------------------|
| 6,965,891 | B1 | 11/2005 | Jakobsson et al.    |
| 7,337,163 | B1 | 2/2008  | Srinivasan et al.   |
| 7,689,614 | B2 | 3/2010  | de la Iglesia et al.|
| 8,332,428 | B2 | 12/2012 | Bonneau et al.      |
| 2001/0039588 | A1* | 11/2001 | Miyamoto ........ H04L 29/12132 709/229 |
| 2002/0078005 | A1* | 6/2002  | Shi ..................... G06F 17/30067 |

(Continued)

FOREIGN PATENT DOCUMENTS

| CN | 102214216 A | 10/2011 |
|----|-------------|---------|
| EP | 1814042 A1  | 8/2007  |

(Continued)

OTHER PUBLICATIONS

Rosie Jones, Kristina Lisa Klinkner, Beyond the session timeout: automatic hierarchical segmentation of search topics in query logs, date Oct. 26-30, 2008, pp. 699-708, ISBN: 978-1-59593-991-3, ACM New York, NY, USA.

*Primary Examiner* — Baoquoc N To
(74) *Attorney, Agent, or Firm* — Iphorizons PLLC; Narendra Reddy Thappeta

(57) ABSTRACT

A virtual directory server (VDS) provided according to an aspect of the present disclosure maintains attribute data identifying a corresponding set of stored attributes associated with each data source, with each data source storing values for associated set of stored attributes. Upon receiving a first request based on query attributes, the VDS identifies a set of data sources based on the stored attribute data, with each data source storing values for at least one of the query attributes. The VDS then forms constituent requests, with each constituent request having a corresponding pruned filter suitable for the respective data source. The constituent requests are sent to the respective data sources. The VDS forms a final response from the constituent responses received from the corresponding data sources by joining the constituent entries, and sends the final response to a client system from which the first request is received.

19 Claims, 18 Drawing Sheets

(56) References Cited

U.S. PATENT DOCUMENTS

| | | | |
|---|---|---|---|
| 2002/0078032 A1* | 6/2002 | Shi | G06F 17/30513 |
| 2004/0059719 A1* | 3/2004 | Gupta | G06F 17/30457 |
| 2004/0117350 A1* | 6/2004 | Cavage | H04L 61/1523 |
| 2009/0150360 A1* | 6/2009 | Harvey | G06F 17/30961 |
| 2013/0219456 A1 | 8/2013 | Sharma et al. | |

FOREIGN PATENT DOCUMENTS

| | | |
|---|---|---|
| JP | 2004348426 A | 9/2004 |
| KR | 771154 B1 | 10/2007 |
| WO | 01009721 A3 | 10/2002 |

* cited by examiner

| Data in Primary Participant | Data in Secondary Participant |
|---|---|
| dn: cn=Ronald, dc=internal,dc=com<br>objectclass: inetorgperson<br>cn: Ronald<br>sn: Anne<br>givenname: Anne Ronald<br>telephonenumber: 54300 | dn: cn=Ronald, dc=external,dc=com<br>objectclass: inetorgperson<br>cn: Ronald<br>sn: Anne<br>title: Manager |
| dn: cn=Sam, dc=internal,dc=com<br>objectclass: inetorgperson<br>cn: Sam<br>sn: Ketty<br>manager: cn=Ronald, dc=internal,dc=com<br>telephonenumber: 54301 | dn: cn=Sam, dc=external,dc=com<br>objectclass: inetorgperson<br>cn: Sam<br>sn: Ketty<br>title: SMTS |
| dn: cn=Richard,dc=internal,dc=com<br>objectclass: inetorgperson<br>cn: Richard<br>sn: Rod<br>title: Trainee<br>manager: cn=Ronald, dc=external,dc=com<br>telephonenumber: 54303<br>description: Trainee for dept 543<br>departmentNumber: 543 | dn: cn=Richard,dc=external,dc=com<br>objectclass: inetorgperson<br>cn: Richard<br>sn: Rod<br>title: Trainee |
| dn: cn=William,dc=internal,dc=com<br>objectclass: inetorgperson<br>cn: William<br>sn: Tent<br>description: User with no title | dn: cn=Mike,dc=external,dc=com<br>objectclass: inetorgperson<br>cn: Mike<br>sn: Ret<br>title: MTS - dept_sec |

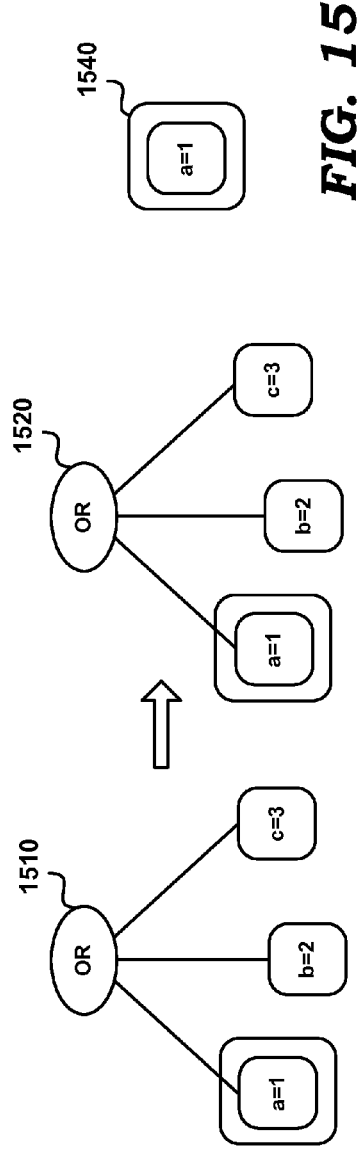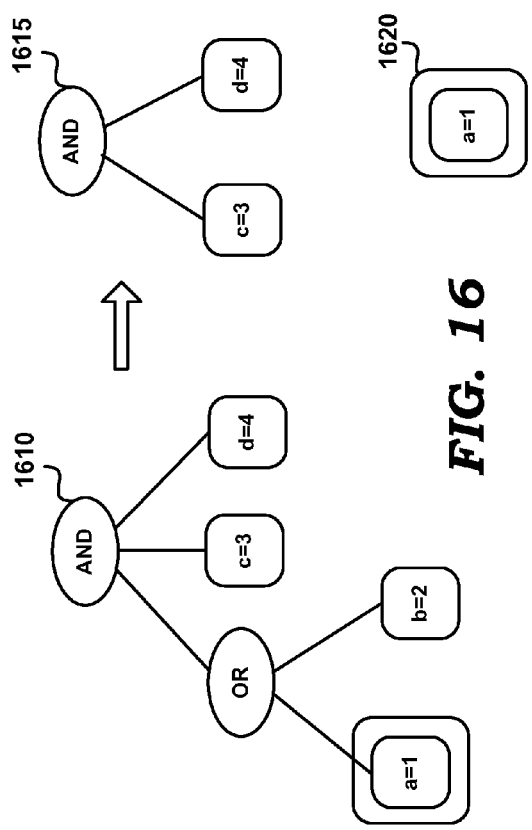
FIG. 15
FIG. 16

US 9,569,507 B2

VIRTUAL DIRECTORY SERVER TO PROCESS DIRECTORY REQUESTS WHEN INFORMATION ON AN OBJECT IS SPLIT ACROSS MULTIPLE DATA SOURCES

BACKGROUND OF THE DISCLOSURE

Technical Field

The present disclosure relates to virtual directory servers, and more specifically to processing directory requests when information on an object is split across multiple data sources.

Related Art

A directory server refers to a server system, which processes directory requests and provides corresponding responses. A directory server commonly stores mapping from name to value for various objects. The names are defined by standards such as X.500 (with LDAP representing a simpler adaptation suited for TCP/IP networking environments), as is well known in the relevant arts. Thus, when a directory request specifies criteria according to the convention used for names, the response indicates the matching values.

A virtual directory server (VDS) is a type of directory server in the sense that client systems can send various directory requests to the VDS, but VDS relies on other (source) data servers (SDSs) such as Directory Servers, RDBMS servers, Web services, etc., for storing and providing the attributes specified in each directory request. Specifically, when a directory request is received, a VDS communicates with a SDS for retrieving the relevant attributes, and provides the retrieved attributes as a response to the directory request.

The information on an object (type) is often split across multiple data sources due to, for example, applications deployed in siloed environments. In one scenario, electronic identity information (e.g., for accessing various enterprise electronic resources) may be managed on a LDAP server, while the human resources (HR) information (e.g., the job title and present salary) may be maintained on a HR management system.

There has been a general need to process directory requests when information on an object is split across multiple data sources. A VDS provided according to aspects of the present disclosure processes such directory requests, as described below with examples.

BRIEF DESCRIPTION OF THE DRAWINGS

Example embodiments of the present disclosure will be described with reference to the accompanying drawings briefly described below.

Each of FIGS. 4A/4B represents the portion of directory information stored in a corresponding participant data store.

Each of FIGS. 5-11 depicts a corresponding directory request used for illustration of a respective general rule in forming pruned filters when each query attribute is stored on only one participant.

Each of FIGS. 12-18 depicts a corresponding directory request used for illustration of a respective general rule in forming pruned filters when at least one query attribute is stored on multiple participants.

Figure 19:
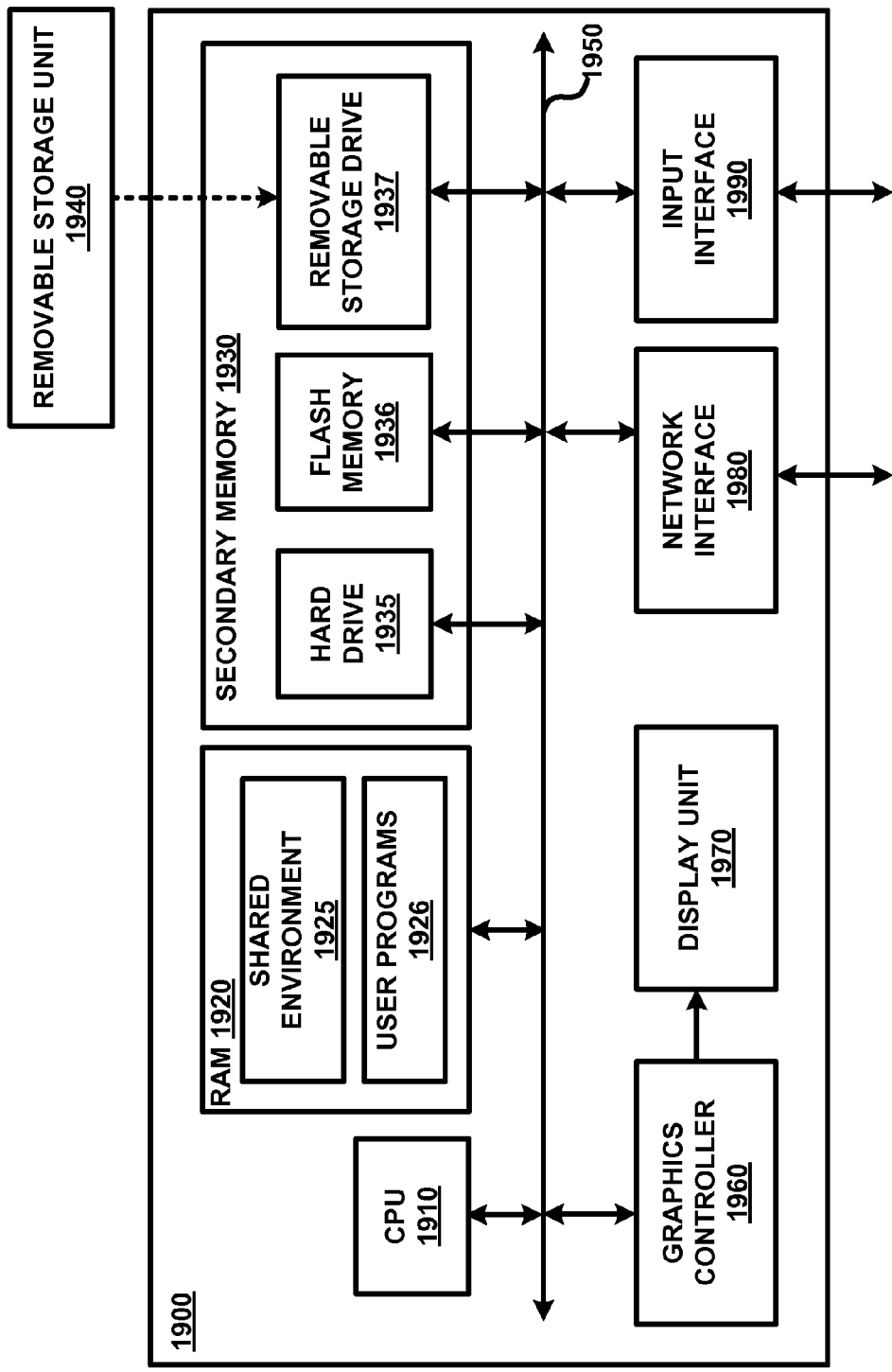

FIG. 19 is a block diagram illustrating the details of a server system in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Definitions (Directory) Request: A request according to X.500/LDAP types hierarchical format.

Attribute: It is a description with one or more associated values. An attribute is generally characterized by a name (identifying the attribute) and the associated values.

Query attribute: An attribute used in a directory request to specify a condition (as a part of the filter, defined below).

Data Source: A server storing at least a portion of directory information about various objects.

Entry: A named collection of information. It consists of a set of attributes that hold information about the object that the entry represents. It is thus a stored piece of information at any level of hierarchy that can be retrieved based on specifying a criteria.

Virtual Directory Server (VDS): A directory server which retrieves entries from data sources after receiving directory requests, and formulates responses based on such retrieved entries. A VDS operates on a hierarchical model in which attributes from multiple data sources are included, and thus an (virtual) entry may be viewed as being split across such multiple data sources.

Filter: The portion of a directory request which qualifies entries for inclusion in a response to a directory request. It defines the conditions that must be satisfied by an entry for the entry to be included in the result set corresponding to the directory request. Logical operators such as 'and', 'or', and 'not' can be used to form filters.

AVA (attribute value assertion): A condition in a filter specified based on a query attribute. For example, assuming "a" is a query attribute, a condition (a=3) in a filter is an example of an AVA.

Sibling in a filter: The filter is viewed as hierarchy of nodes, with the highest node containing a logical operator or an AVA in case of just one node. The nodes at a same relative level (compared to the highest node) are said to be siblings. A sibling can be either a logical operator or an AVA.

Search Result: The set of entries that match the conditions specified in the directory request.

Original Filter: The filter in an original request received by VDS

Pruned Filter: A filter of a constituent query sent to a corresponding participant data source. The pruned filter for a participant data source contains only those AVAs of the original filter that have attributes stored in the participant data source.

2. Overview

A virtual directory server (VDS) provided according to an aspect of the present disclosure maintains attribute data identifying a corresponding set of stored attributes associated with each data source, with each data source storing values for associated set of stored attributes. Upon receiving a first request based on query attributes, the VDS identifies a set of data sources based on the stored attribute data, with each data source storing values for at least one of the query attributes. The VDS then forms constituent requests, with each constituent request having a corresponding pruned filter suitable for the respective data source. The constituent requests are sent to the respective data sources. The VDS forms a final response from the constituent responses received from the corresponding data sources, and sends the final response to a client system from which the first request is received.

According to another aspect of the present disclosure, the pruned filter for a participant data source contains only those AVAs of the original filter that have attributes stored in the data source. In addition, the pruned filter is designed to retrieve a superset (including identical/equal set) of split entries, compared to the final search results returned to the client. Accordingly, the original filter is again applied on the joined entries formed from various constituent responses to form the search result entries for the final response. As a result, the result set contains accurate results, though the attributes (of split entries) are sourced from several data sources and more superset of entries are retrieved from each data source.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

3. Example Environment

Figure 1A:
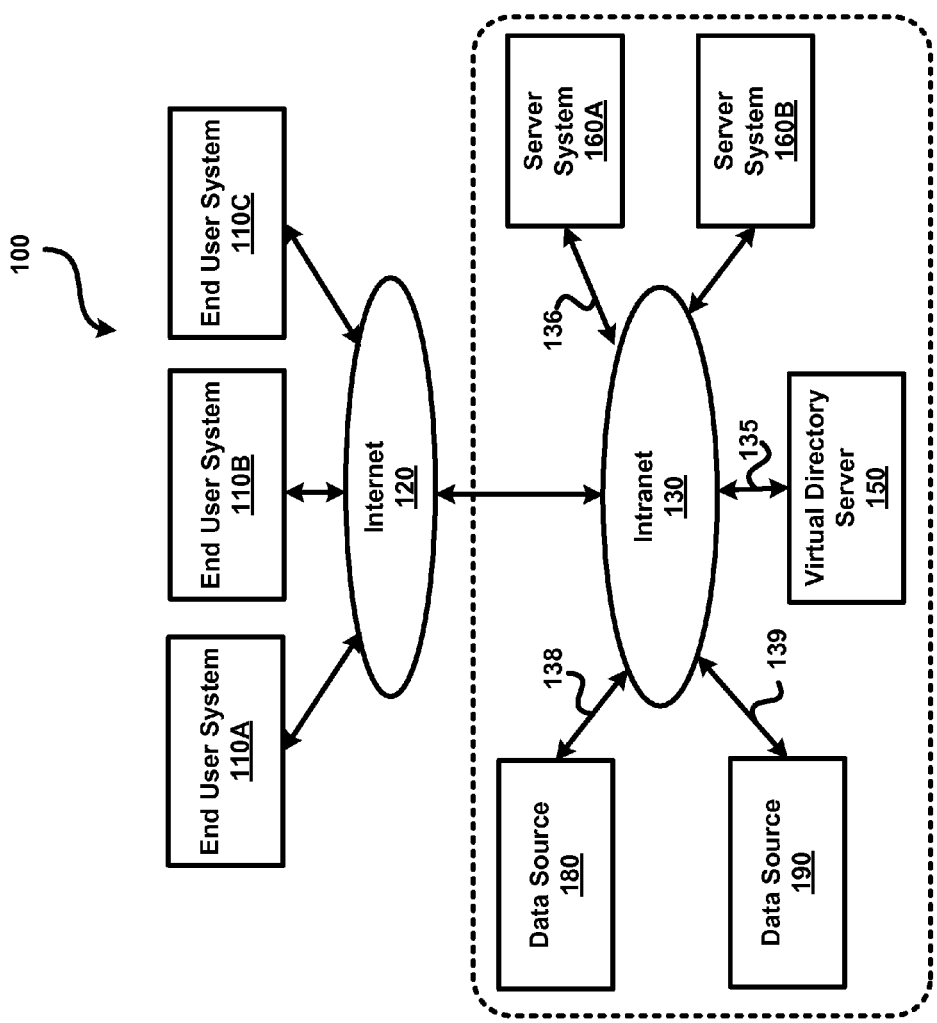
FIG. 1A is a block diagram illustrating an example environment in which several aspects of the present invention can be implemented

FIG. 1A is a block diagram illustrating an example environment (computing system 100) in which several aspects of the present invention can be implemented. The block diagram is shown containing end user systems 110A-110C, Internet 120, intranet 130, virtual directory server (VDS) 150, server systems 160A-160B, and data sources 180 and 190.

Merely for illustration, only representative number/type of systems is shown in FIG. 1A. Many environments often contain many more systems, both in number and type, depending on the purpose for which the environment is designed. Each system/device of FIG. 1 is described below in further detail.

Intranet 130 represents a network providing connectivity between VDS 150, server systems 160A-160B, and data sources 180 and 190, all provided within an enterprise (as indicated by the dotted boundary). Internet 120 extends the connectivity of these (and other systems of the enterprise) with external systems such as end user systems 110A-110C. Each of intranet 130 and Internet 120 may be implemented using protocols such as Transmission Control Protocol (TCP) and/or Internet Protocol (IP), well known in the relevant arts.

In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 130. When the packet contains content such as port numbers, which specifies the target application, the packet may be said to be directed to such application as well.

Each of server systems 160A-160B represents a server, such as a web/application server, executing business/enterprise applications capable of performing tasks (e.g., processing requests like user authentication, determining roles associated with a user etc) requested by users using one of end user systems 110A-110C. A server system may use data stored internally, external data (e.g., identity information) maintained in data sources 180/190 or that received from external sources (e.g., from the user) in performing such tasks. The server system then sends the result of performance of the tasks to the requesting end user system (one of 110A-110C).

Each of end user systems 110A-110C represents a system such as a personal computer, workstation, mobile station, etc., used by users to generate (user) requests directed to business/enterprise applications executing in server systems 160A-160B. The requests may be generated using appropriate user interfaces. In general, a client system requests an application for performing desired tasks and receives corresponding responses containing the results of performance of the requested tasks. Each request is sent in the form of an IP packet directed to the desired server system, with the IP packet including data identifying the desired tasks in the payload portion.

Each of data sources 180 and 190 makes accessible respective portions of directory of information related to an enterprise (such as users, dynamic/static groups, resources, organizational units, etc.). The information may be maintained by enterprise applications executing in server systems 160A-160B. Broadly, the enterprise information is stored in the form of entries, with each entry containing a set of attributes that hold information about a real-world object (e.g., person, organizational unit, country, etc.) that the entry represents. Each attribute has an associated unique name/description referred to as Distinguished Name (DN) and one or more associated values.

Each entry stored in a data source is also associated with a Relative Distinguished Name (RDN) relative to a second entry (considered as the entry's immediate superior). The second entry similarly has an associated RDN relative to a third (superior) entry. The DN of each entry is accordingly defined as the concatenation of the entry's RDN and its immediate superior's DN. Due to such a naming convention, the set of entries stored in each directory server can be viewed as being organized according to a hierarchical data model (with the root being the entry with no RDN).

Though the description is provided assuming that the data in each data source is organized according to hierarchical data model and that each data store also responds to queries in accordance with LDAP/X.500, alternative embodiments may be implemented with some of the data sources being implemented using other data storage models (e.g., relational) and other query formats (e.g., SQL).

VDS 150, provided according to aspects of the present disclosure, processes (and thus responds to) directory requests by interfacing with data sources 180 and 190. The directory requests may be based on hierarchical view of organization of the directory of information, for example, in accordance with LDAP. Additional details on directory and LDAP are described in RFC 4511, while details on the hierarchical/directory information models are described in RFC 4512.

The enterprise applications executing in server systems 160A-160B are accordingly designed to access the stored identity/directory information by sending requests to a virtual directory server (such as VDS 150). The manner in which data may be accessed using a virtual directory server is described below with examples.

4. Virtual Directory Server

Figure 1B:
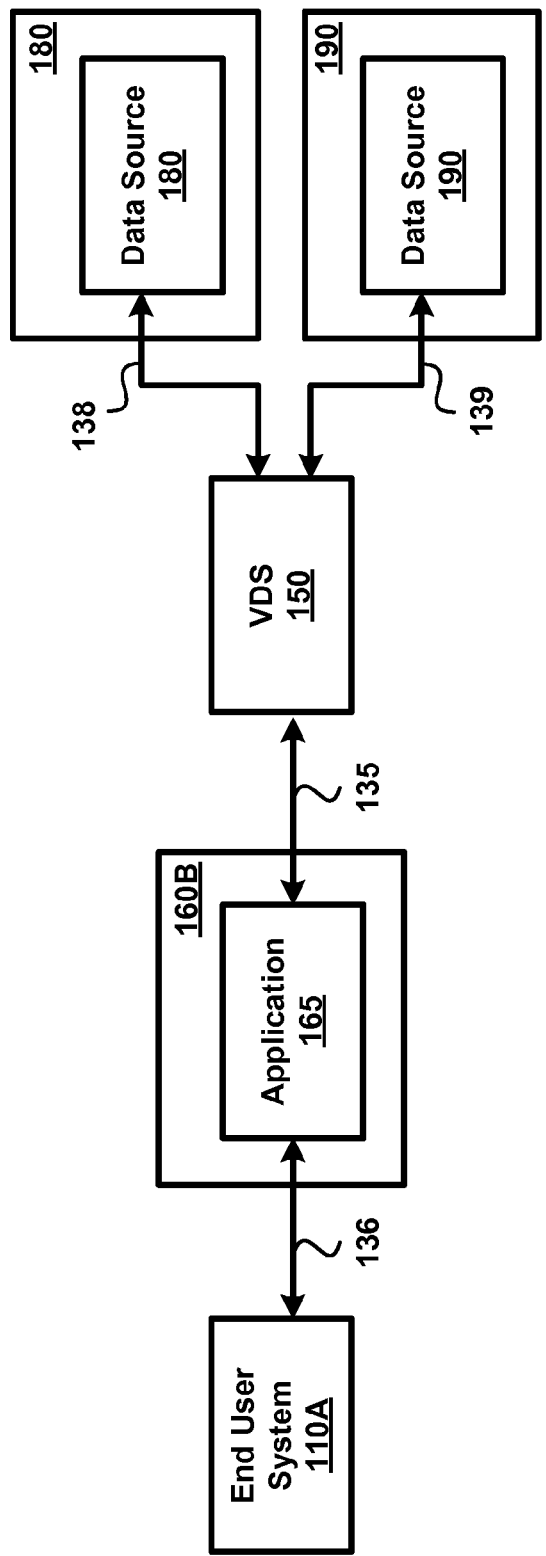
FIG. 1B is a block diagram depicting additional details of example environment of FIG. 1A, illustrating the manner in which directory requests are processed using a virtual directory server (VDS) in one embodiment.

FIG. 1B is a block diagram depicting additional details of computing system 100 of FIG. 1A, illustrating the manner in which data is accessed using a Virtual Directory Server (150) in one embodiment. Each of the blocks is described in detail below.

Application 165 represents a business/enterprise application executing in server system 160B which receives (client) requests for performing specific tasks from users using end user system 110A (via path 136). In response to the requests, application 165 may send directory requests directed to VDS 150 (via path 135) for accessing/retrieving the information (such as those noted above) required for processing of the requests. The directory requests are according to LDAP, and specify hierarchically connected paths (for retrieving, adding, modifying or deleting the desired entries and/or attribute values) in the hierarchical model exposed by VDS 150.

Virtual directory server (VDS) 150 receives the directory requests from application 165 and then processes the requests based on the information available in the backend servers 180/190. Thus, VDS 150 retrieves the relevant attributes from data sources 180/190, and provides appropriate responses to application 165.

As noted above, there is often a requirement to process directory requests when information on an object is split across multiple data sources. A VDS provided according to aspects of the present disclosure processes such directory requests, as described below with examples.

5. Processing Directory Requests in VDS

Figure 2:
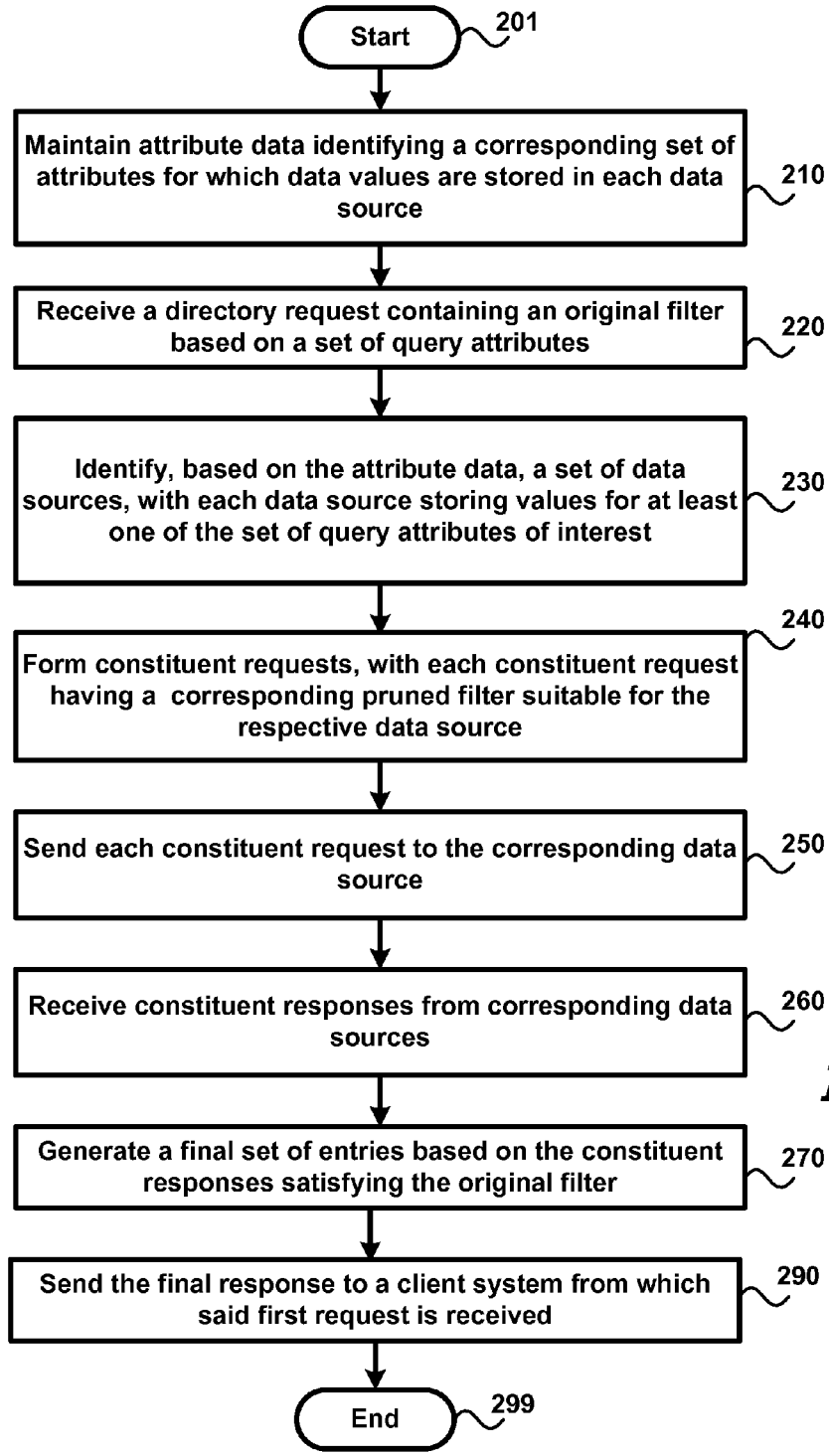
FIG. 2 is a flow chart illustrating the manner in which a VDS processes directory requests according to an aspect of the present disclosure.

FIG. 2 is a flow chart illustrating the manner in which a VDS processes directory requests according to an aspect of the present disclosure. The steps of the flowchart are described with respect to FIGS. 1A and 1B merely for illustration. However, the features can be implemented in other systems and environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, VDS 150 maintains attribute data identifying a corresponding set of attributes for which data values are designed to be stored in each data source. The directory structure (of DIT) served by each data source may be examined to identify the corresponding set of attributes. The attribute data further specifies join rules indicating conditions in which (split) entries of respective data sources together can be viewed as a single entry from the perspective of VDS 150.

In step 220, VDS 150 receives a directory request containing an original filter based on a set of query attributes. The original filter may be viewed as a tree, with AVAs as the leaf nodes which are connected by various logical operators at higher levels of the hierarchy (in the tree). Each AVA contains a corresponding query attribute, with all such attributes of AVA together forming the set of query attributes.

In step 230, VDS 150 identifies, based on the maintained attribute data, a set of data sources, with each data source storing values for at least one of the query attributes of interest. It is assumed that the set of query attributes of the original filter contains a first set of AVAs having query attributes stored in data source 180 and a second set of AVAs having query attributes stored in data source 190, thereby requiring attributes from both the data sources to form a response to the directory request.

In step 240, VDS 150 forms constituent requests, with each constituent request having a corresponding pruned filter suitable for the respective data source. As noted above, the pruned filter for a participant data source contains only those AVAs of the original filter that have attributes stored in the data source. As a result, there are often situations in which one of the AVAs present in an original query may be absent in the pruned filter of at least one participant data source. As described in further detail below, in general, the pruned filter has less than or equal to restrictive conditions (compared to the original filter) such that the constituent query would retrieve a superset (or identical) set of split entries compared to those that would be present in the final response/result.

In step 250, VDS 150 sends each constituent request to the corresponding data source, and in step 260, VDS 150 receives a corresponding constituent response from the same data source. The entries in each constituent response thus satisfy the corresponding pruned filter sent to the data source.

In step 270, VDS 150 generates a final set of entries joined from matching constituent entries from different data sources that satisfy the conditions in the original filter. In an embodiment, the split entries are joined by the appropriate join policy and the original filter is applied to generate the search result of the final set.

In step 290, VDS 150 sends the final response to a client system from which the directory request is received. The final response contains only those attributes of the joined entries, that are requested in the directory query. The flow chart ends in step 299.

Thus, VDS 150 may process query requests based on split entries stored across multiple data sources. In view of the use of the pruned filters according to aspects of the present disclosure, accurate final response may be sent, with a view that the data sources together store the information of various objects of interest. The description is continued with respect to the details of example embodiments of VDS 150.

6. Example Implementation

Virtual Directory Server

Figure 3:
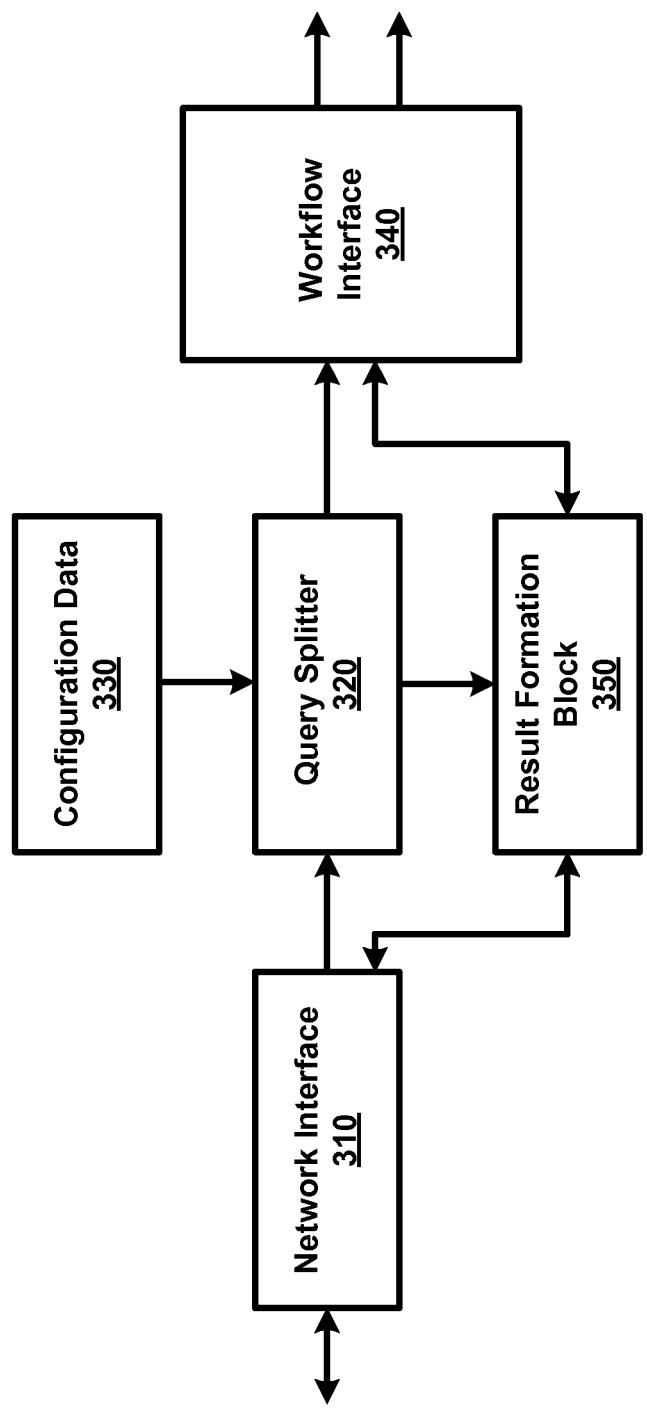
FIG. 3 is a block diagram illustrating the details of a VDS as relevant to processing of requests in an embodiment.

FIG. 3 is a block diagram illustrating the details of a virtual directory server as relevant to processing of requests in an embodiment. VDS 150 is shown containing network interface 310, query splitter block 320, configuration data 330, workflow interface block 340 and result formation block 350. Each block is described below in further detail.

Network interface 310 provides electrical and protocol interfaces (e.g., network cards, network protocol stacks, etc.) to enable various blocks of VDS 150 to communicate via network 120. In general, packets directed to VDS 150 are examined for forwarding to the appropriate internal block/application. Similarly, network interface 310 sends packets directed to other external client systems shown in FIG. 1 (upon receipt of the corresponding packets, with identity of the target system, from the respective block). Network interface 310 may be implemented in a known way.

Configuration data 330 represents a memory storing data representing attribute data noted above. The attribute data may indicate the attributes served by each data source and the link between entries. For example, in the data shown in two data stores in FIGS. 4A/4B (first storing identity information and the second storing the human resources (HR) information) respectively, the attribute data indicates that the data source 180 of FIG. 4A has data elements (attributes) corresponding to attributes 'cn', 'sn', 'givenname', 'telephonenumber', 'departmentnumber', etc. (of inetorgperson objectclass), while data source 190 of FIG. 4B has 'cn', 'sn' and 'title' from the same objectclass. A join rule may specify that 'cn' is the common attribute to link the split entries.

Continuing with exclusive reference to FIG. 3, workflow interface 340 provides suitable interfaces for retrieving corresponding entries from each of the data sources. The constituent queries formed by query splitter 320 may be converted to a suitable format, consistent with the implementation of the data sources (e.g., into SQL queries, in case a data source is implemented based on relational database technology). The responses may be provided in a consistent single format (e.g., LDAP/X.500) to result formation block 350. Two external arrows are shown corresponding to the two data sources 180/190.

Query splitter 320 receives directory requests from end user systems 110A-110C via network interface 310 and forms constituent queries (including the corresponding pruned filters) for respective data sources, based on the information available in configuration data 330. The constituent queries are sent to the corresponding data sources using workflow interface 340.

Result formation block 350 receives (split) entries corresponding to each of the constituent responses from workflow interface 340, and generates search results that contain (joined) entries satisfying the conditions in the original filter of the directory request. The elements of the final set of entries, requested in the directory request are sent as a response to the application 165 from which the directory request is received. In general, result formation block 350 needs to be implemented consistent with query splitter 320. The manner in which pruned filters for each data source are constructed and the final set of entries may be formed for each directory request, is described below with examples.

7. Processing of Directory Requests

Introduction

In an embodiment of the present disclosure, the pruned filters of the constituent requests are designed to avoid erroneous elimination of entries in constituent responses from respective data sources. As described below, the pruned filters may be formed by:

A. not including some of the AVAs, in a constituent query to a data source even if the data source stores the elements corresponding to query attributes specified in such condition.

B. making appropriate changes to the logical operators.

However, the not-included conditions and the attribute constraints of the original query are enforced by result formation block 350 while generating the final set of entries, as illustrated by examples below.

Furthermore it is assumed that VDS 150 may store configuration data (ds-cfg-participant-attribute) indicating the specific attributes available in each data source (participant) for VDS 150 to query in processing directory requests. Accordingly, the constituent query for each data source may contain only those attributes that are indicated to be made available for that data source.

Also, the two data sources 180 and 190 are referred to as participants P1 and P2 in the examples below for conciseness. A participant is a data source, which provides data required for formation of a response. The formation of pruned filter is described substantially with respect to the constituent query sent to P1. However, similar logic may be applied to the pruned filter sent for P2 as well.

In the description below, P1 is referred to as a primary participant, which can be configured by a user for VDS 150. Ideally, the primary participant needs to include substantial information required for processing queries (e.g., LDAP server, which may be deemed to contain data for all directory objects). However, in not-so-common queries which require information/attributes stored from only data sources not configured as a primary, any participating data source may be dynamically selected as a primary participant for the purpose of description on pruned filters below. The remaining participants are referred to as secondary participants.

Broadly, processing of a directory request entails (A) formation of pruned filters for respective participants; (B) executing the constituent requests, with the corresponding pruned filters, on the respective participants to retrieve the corresponding constituent responses; (C) performing of joins to identify the joined entries (or objects of the search result) that form the basis for the response; (D) Applying the original filter on the joined entries; and (E) sending those attributes of the joined entries, as the final response to the user system from which the directory request is received.

Continuing now with the formation of the pruned filters, there are two distinct scenarios, which call for corresponding different approaches. In a first scenario, the elements corresponding to none of the query attributes is stored on more than one data source, i.e., the elements of a given query attribute are stored on either primary participant or secondary participant, but not both. In a second scenario, the elements of at least one query attribute are stored in multiple data sources.

The description is continued with respect to specific examples in both scenarios. It will be apparent to one skilled in the relevant arts, how to apply the approaches described herein, to address any complex directory requests, by reading the disclosure provided herein.

8. Pruned Filters

Each Query Attribute Stored on Only One Participant

Case 1 illustrates a situation in which P1 stores "cn" and does not store "sn" attribute. On the other hand, P2 stores "sn" and contributes "sn" attribute for joined entries. Assuming that the original filter in an incoming directory request is (&(cn=John)(sn=Smith)), wherein "&" represents the logical AND operator, the pruned filter sent to P1 would be (cn=John) and that sent to P2 would be (sn=Smith).

Upon receiving the constituent response, the entries corresponding to the two constituent responses are joined (based on common attribute(s), as specified by configuration data), and the conditions of the original filter (i.e, (&(cn=John)(sn=Smith))), are applied on the joined results, to obtain the final set of entries from the results of joining.

As may be readily appreciated, by excluding the attributes not present in a data source in the pruned filter sent to the data source, the intended result is accurately obtained.

According to a convention here, in FIGS. 5-11, an attribute available only in data source (P2) 190 (but not in data source (P1) 180) is shown with an additional dotted enclosure. In these figures, the remaining attributes are deemed to be available only in data source (P1) 180.

As noted above, VDS 150 forms each pruned filter (directed to a corresponding data source) to contain only those AVAs with query attributes present in the corresponding data source. The description is continued with an illustration of creating pruned filters for various original requests received.

Figure 5:
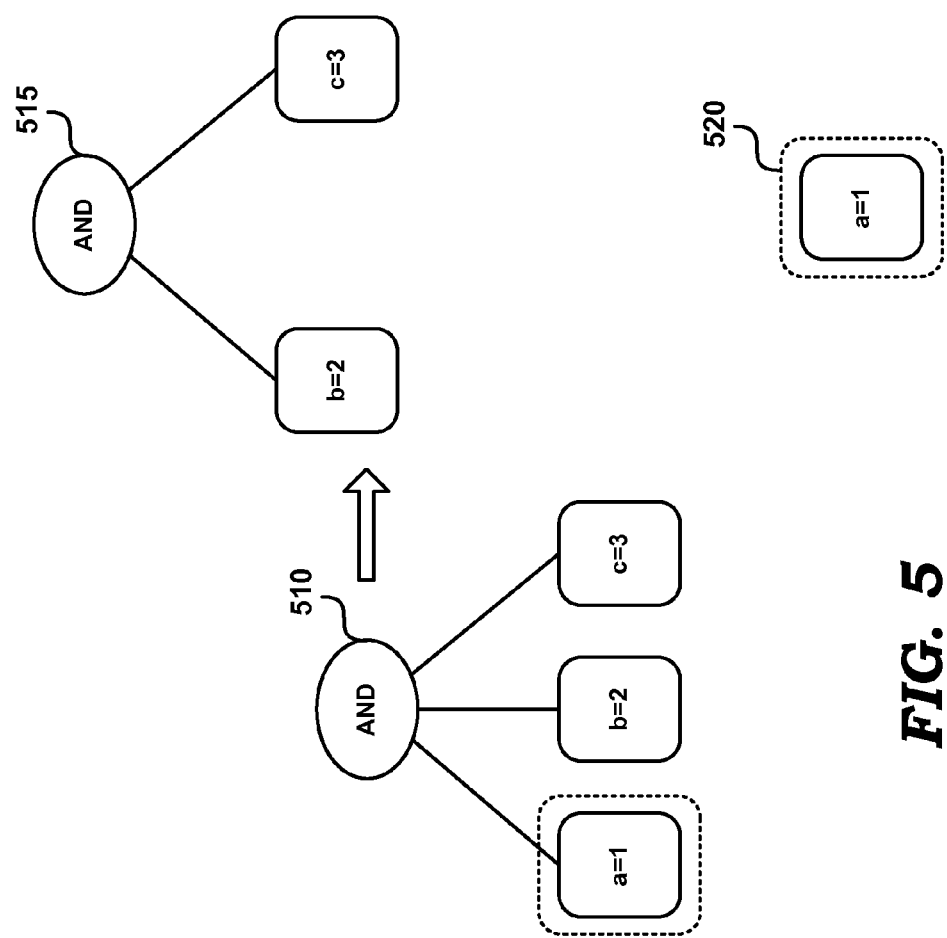

FIG. 5 illustrates pruned filters formed when original filter 510 contains an AND logical condition at the highest (or a high) level (root) of hierarchy and AVAs with a query attribute 'a' present in participant P2 only, and query attributes 'b' and 'c' present in P1.

Accordingly, the pruned filters sent to P1 and P2 are shown as 515 and 520 respectively. The corresponding constituent responses are joined, and the (AND condition of) original filter 510 is thereafter applied on the joined results, to obtain the final set of entries, as desired. It may be appreciated that the result sets from both the sources may have additional entries (compared to those included in the final set), but are removed when the original filter is applied on the joined results.

Thus, when an AND condition is present at a high level of hierarchy and there is an unavailable (i.e., within that data source or participant) attribute in the immediate lower level, the pruned filters contain only the specific AVAs with query attributes available in the corresponding data source, with the AND condition being retained. The unavailable attribute is absent in the pruned filter.

Figure 6:
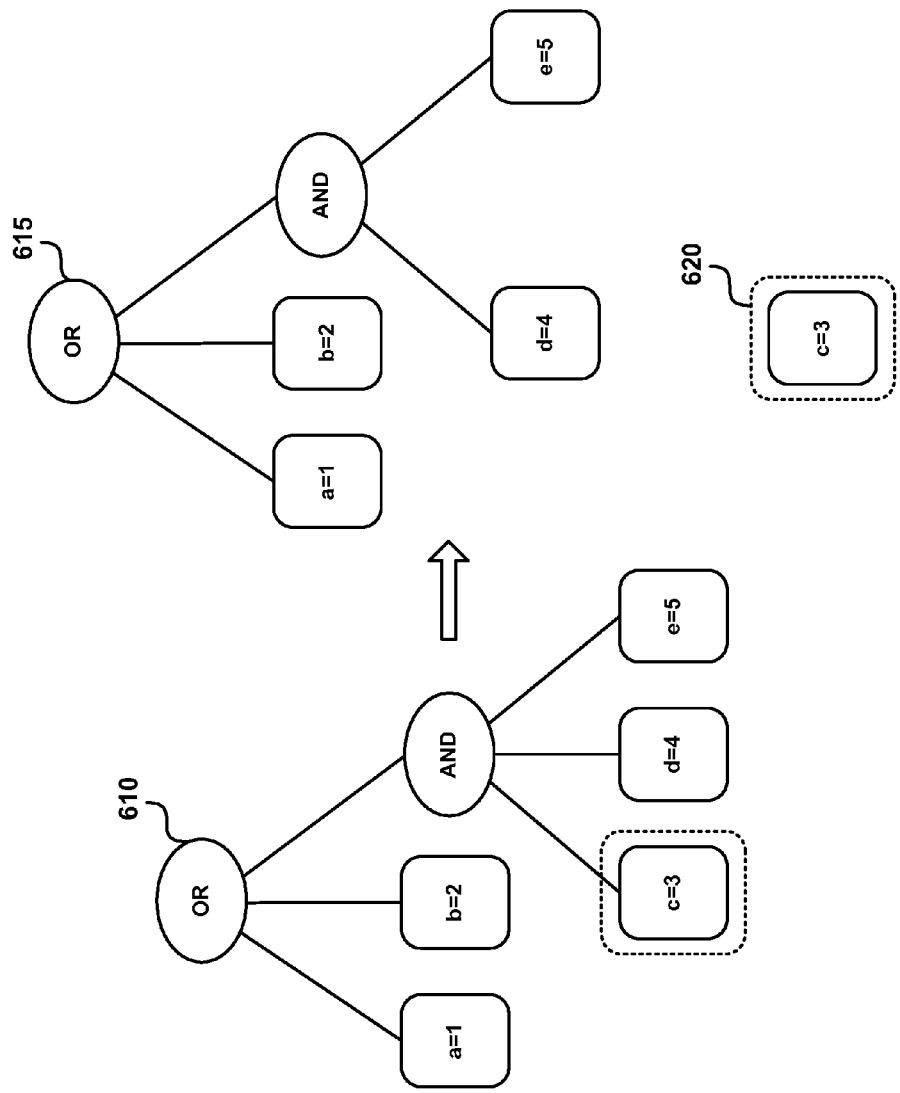

FIG. 6 illustrates pruned filter formed for original filter 610 in which an OR logical condition is present at the highest level (root) of hierarchy, with one of the branches having an AND logical condition based on AVAs containing some query attributes available only in P1 and some others available only in P2. Thus, query attribute 'c' is available only in P2, while query attributes 'a', 'b', 'd' and 'e' are deemed to be available in P1.

The pruned filters sent to P1 and P2 are shown as 615 and 620 respectively. The pruned filter 620 sent to P2 is obtained in accordance with this rule in FIG. 6 (wherein attributes 'd' and 'e' unavailable in P2 are removed) and sought to be illustrated rule in FIG. 7 (wherein attributes 'a' and 'b' unavailable in P2 are removed). The corresponding constituent responses are joined, and the (OR condition of) original filter 610 is thereafter applied on the joined results, to obtain the final set of entries, as desired.

Thus, the processing of an AND node is similar to as in FIG. 5, even though the AND node is presented as a branch of an OR condition.

Figure 7:
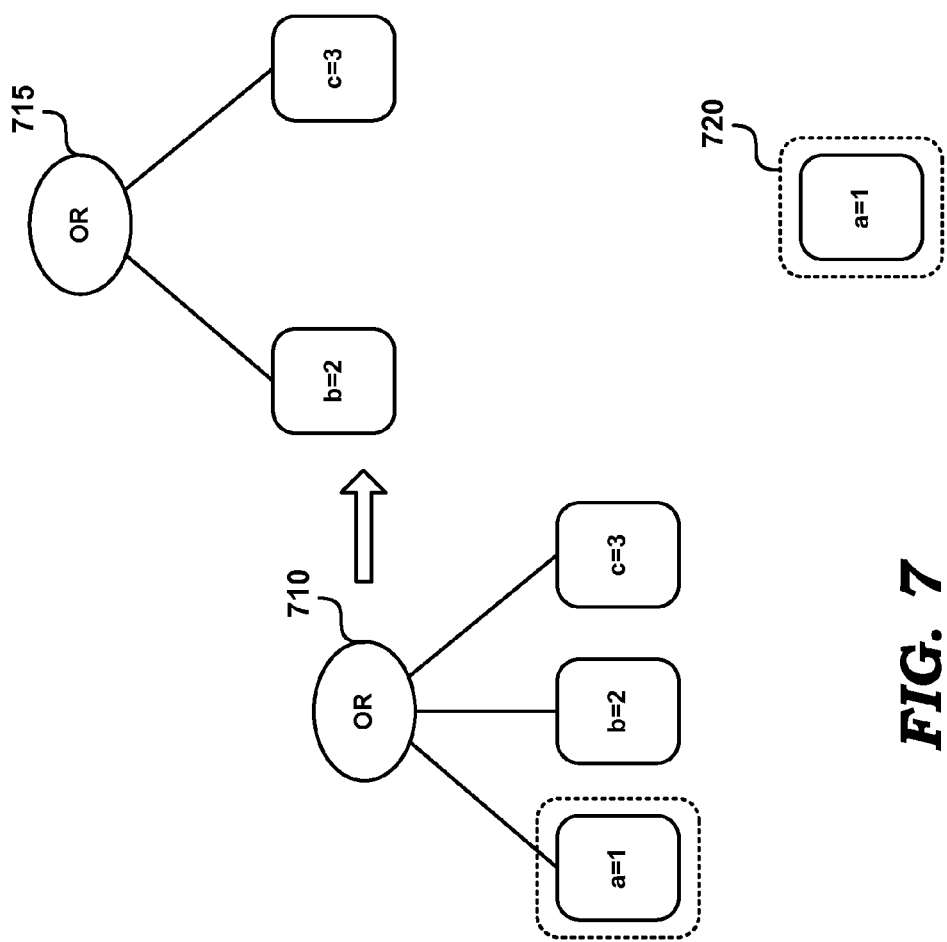

FIG. 7 illustrates original filter 710 in which an OR logical condition is present at the highest level (root) of hierarchy, with some query attributes (in corresponding AVAs) at the immediate level being available in primary participant P1 and some others being available only in P2. Thus, 'a' is shown available only in P2, while 'b' and 'c' are deemed to be available in P1.

Accordingly, the pruned filters sent to P1 and P2 are shown as 715 and 720 respectively. The corresponding constituent responses are joined, and the (OR logical condition of) original filter 710 is applied on the joined results, to obtain the final set of entries, as desired.

Thus, when an OR logical condition is present at a level, the pruned filters sent to each participant merely contain AVAs with query attributes that are available in the corresponding data source. In other words, the attributes available in the other participants are absent in the pruned filter sent to each participant.

Figure 8:
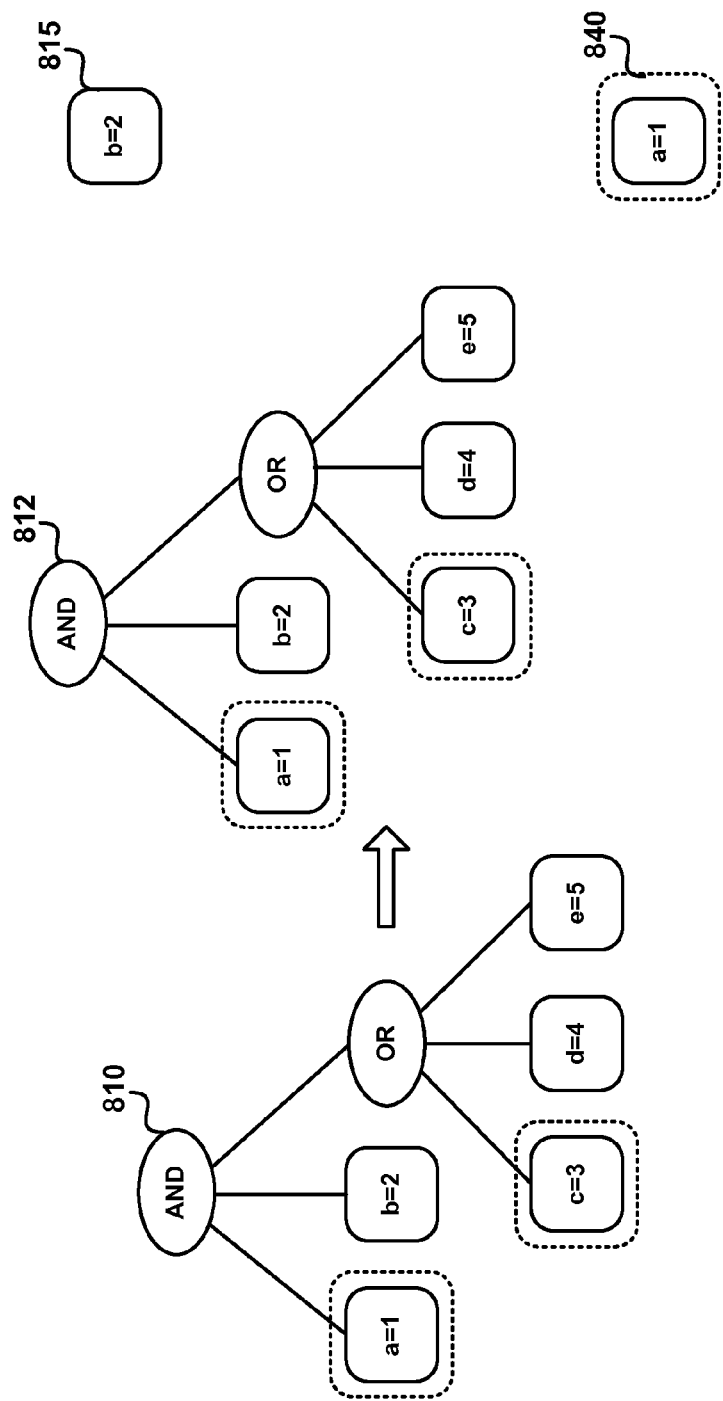

FIG. 8 illustrates original filter 810 in which an AND logical operator is present at the highest level (root) of hierarchy, with one of the branches having an OR logical condition. Broadly, when AND node is the parent of OR node containing a SecondaryOnly attribute (i.e., there is at least one attribute of the children of OR node, that is present only in P2, but not P1) and at least one sibling of OR contains a PrimaryOnly attribute (i.e., there is at least one sibling attribute of OR node present only in P1, but not P2), then remove the complete OR component and change the original filter to an AND of all PrimaryOnly AVAs (i.e., the siblings of OR node that are present only in P1).

Thus, 'c' represents the SecondaryOnly attribute available only in P2, while 'b' represents a sibling of OR condition which is a PrimaryOnly attribute available in P1 only.

Accordingly, the pruned filters sent to P1 and P2 are shown as 815 and 840 respectively. Intermediate filter 812 is shown with the view that the OR and branches are treated as being removed (with dotted enclosure around OR node) in the formation of corresponding pruned filters. The corresponding constituent responses from P1 (merely b=2) and P2 (a=1) are joined, and the original filter 810 is thereafter applied on the joined results (AND condition of 'a', 'b' and OR condition of 'c', 'd', and 'e', examined in the joined results set), to obtain the final set of entries, as desired.

Thus, it may be appreciated that the OR branch having only some sub-elements available in either participants is entirely ignored in forming the pruned filters, thereby getting a more expansive set of results than that is in the final results. However, the conditions of the original filter are applied to remove the entries not matching the original filter.

According to an aspect of the present disclosure, the same rule of FIG. 8 is applicable even if the PrimaryOnly attribute of the OR sibling is instead present in both P1 and P2. Accordingly, the rule may be stated as, when AND node is the parent of OR node containing a SecondaryOnly attribute (i.e., there is at least one attribute of the children of OR node, that is present only in P2, but not P1) and at least one sibling of OR contains a Primary attribute (i.e., there is at least one sibling attribute of OR node present only in P1, or both P1 and P2), then remove the complete OR component and change the original filter to an AND of all Primary AVAs (i.e., the siblings of OR node that are present in P1).

Figure 9:
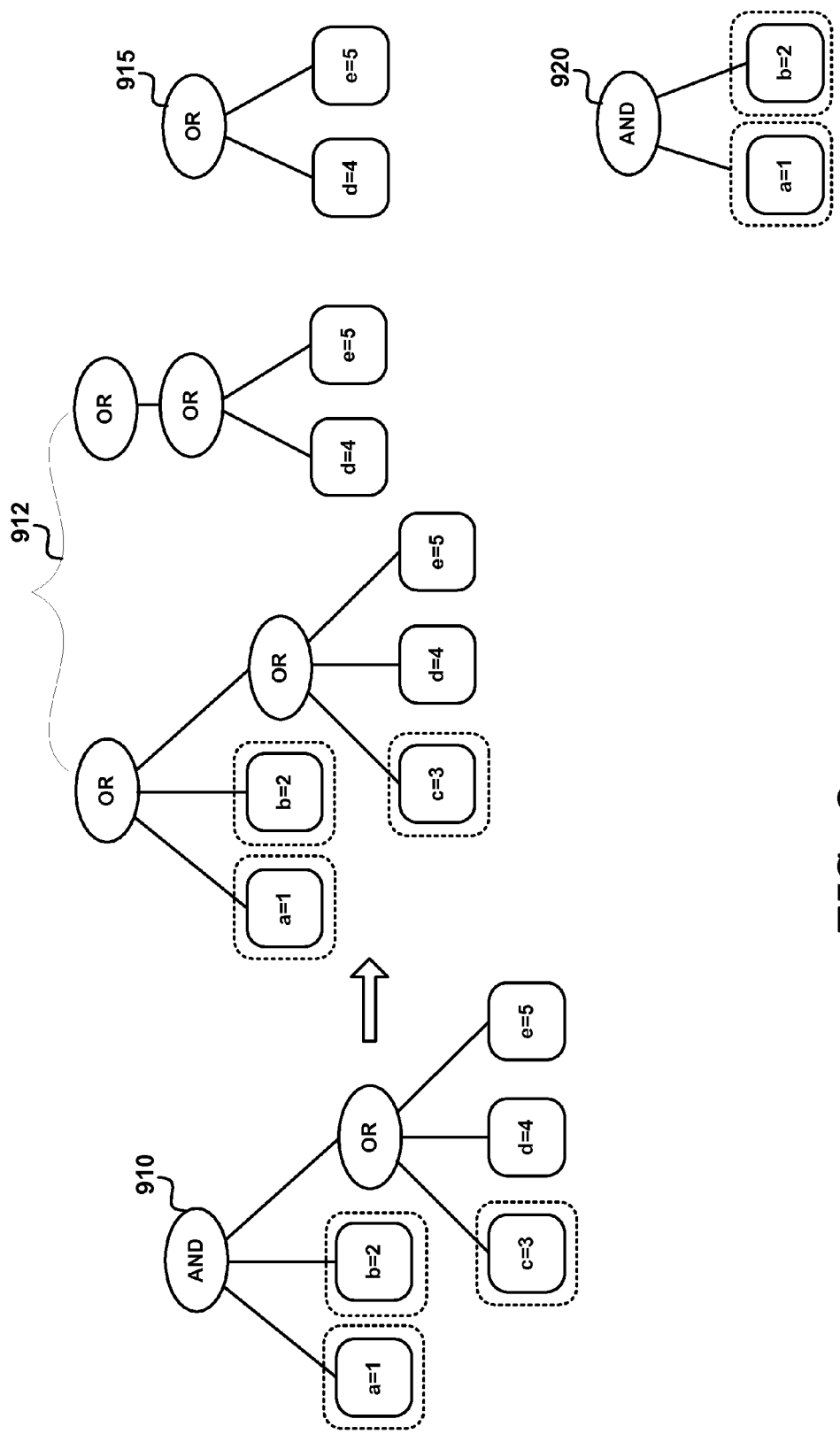

FIG. 9 illustrates original filter 910 in which a directory request contains an AND logical condition (at root) of an OR node in combination with AVAs having attributes that are present only in P2 (secondary participant). Thus, 'a' and 'b', which are siblings of OR node, are shown available only in P2. The Figure further shows a situation in which there is at least one secondaryOnly AVA as a child of the OR node.

The case illustrates a general rule that when an AND node is the parent of OR node containing a SecondaryOnly attribute, and if there is no sibling of OR which contains Primary attribute (either as PrimaryOnly attribute, or as a shared attribute present in both the Primary and Secondary), just remove the SecondaryOnly attribute AVAs and change the original AND node to an OR node.

The pruned filters sent to P1 and P2 are shown as 915 and 920 respectively. The pruned filter sent to primary participant is the OR of the corresponding attributes of the child AVAs to OR node of the original filter, available in the participant. It may be appreciated that pruned filter 915 is constructed according to the rule developed with respect to FIG. 9, while pruned filter 920 sent to the secondary participant P2, is developed in accordance with the rule developed with respect to FIG. 8.

912 depicts the intermediate steps in formation of the pruned filter for primary participant P1. In particular, the AND node is shown changed to OR, and the siblings of OR node are shown removed.

The corresponding constituent responses are joined, and the (AND condition of) original filter 910 is thereafter applied on the joined results, to obtain the final set of entries, as desired.

Figure 10:
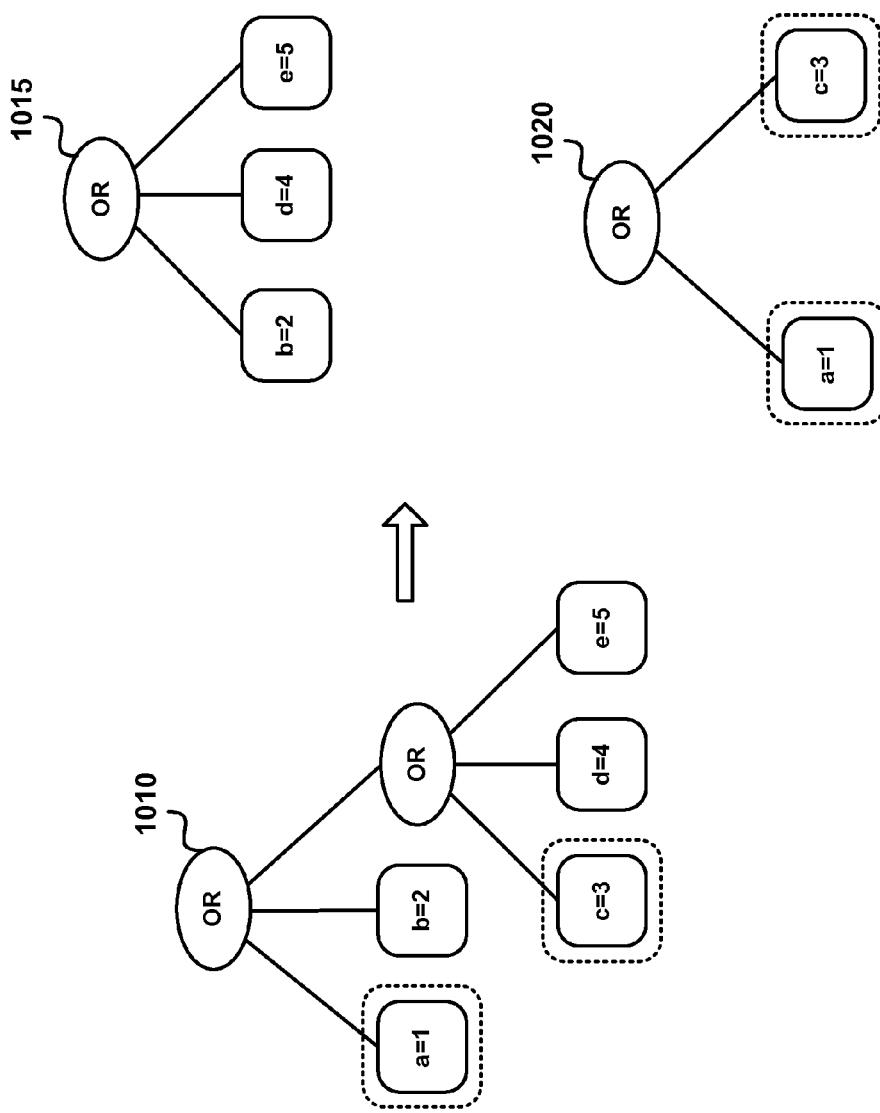

FIG. 10 depicts a directory request used to illustrate a general rule that if a hierarchy is formed only by OR logical operators, the unavailable attributes are removed, and the pruned filter for each participant is formed as a logical OR of the attributes available in that participant. This is an extension of Rule in FIG. 7 where this rule is applied once at each OR node.

Thus, original filter 1010 is shown containing OR operator both at a root/high level and as a child node. At both levels, attributes available and unavailable at primary participant P1 are shown. Thus, 'a' and 'c' are shown available only in P2, while 'b', 'd' and 'e' are deemed to be available in P1.

Accordingly, the pruned filters sent to P1 and P2 are shown as 1015 and 1020 respectively. The corresponding constituent responses are joined, and the (OR condition of) original filter 1010 is thereafter applied on the joined results, to obtain the final set of entries, as desired.

Figure 11:
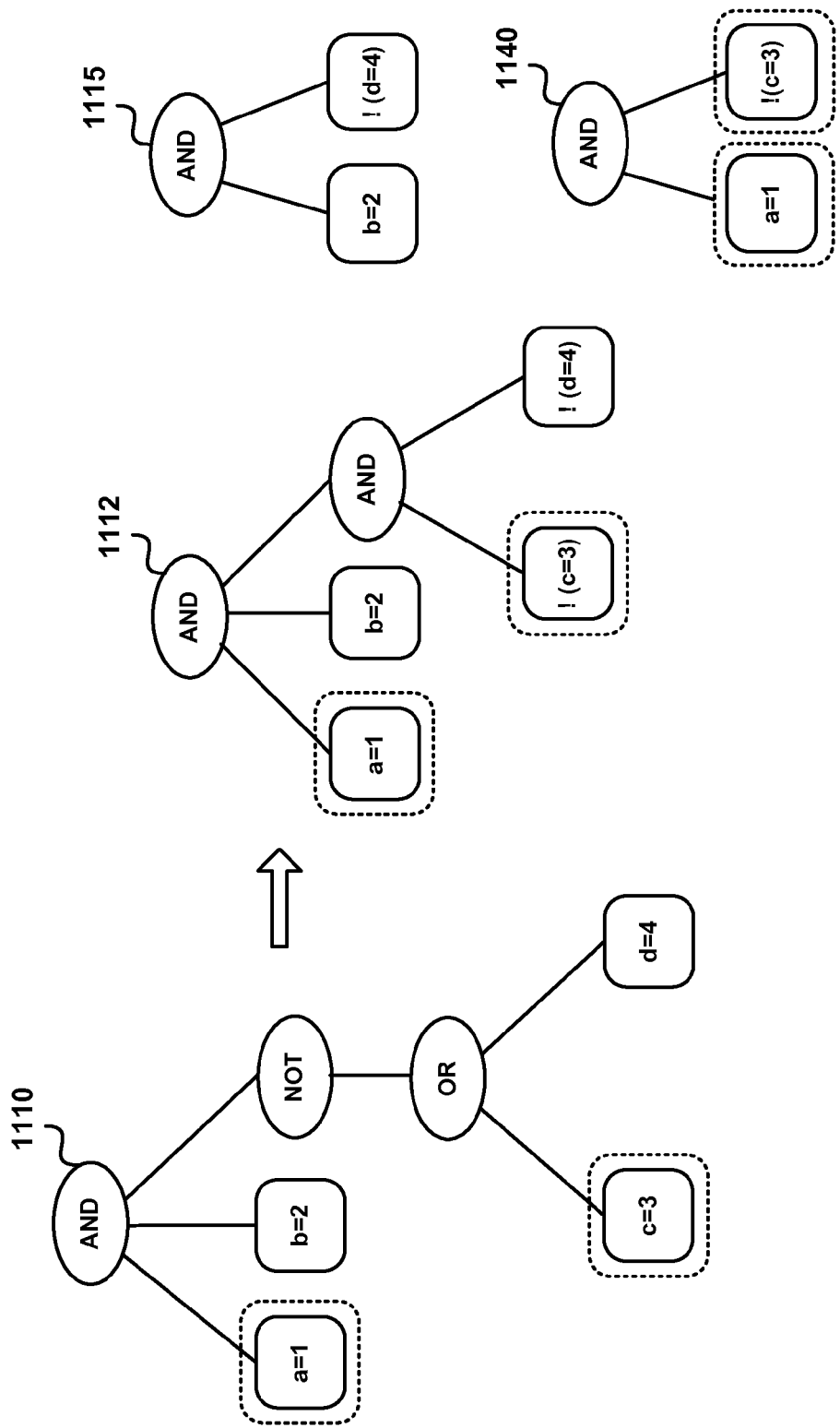

FIG. 11 depicts a directory request used to illustrate a general rule that when an original filter contains NOT condition, De Morgan's law (well known in the relevant arts) is applied to remove the NOT node from the filter by pushing the NOT operator down the tree till the leaf nodes, changing intermediate nodes like OR to AND and AND to OR operator. The intermediate filter thus obtained is processed in accordance with other rules described herein to obtain the pruned filters for each participant.

Pruned filters to P1 and P2 are shown respectively as 1115 and 1140. Intermediate filter 1112 is shown with De Morgan's law applied on the NOT logical condition of original filter 1110. Thus, the NOT and OR nodes combination of filter 1110 is shown replaced by AND, with the lower level nodes having NOT logical operator (!) added, in filter 1112.

Pruned filters 1115 and 1140 are obtained in accordance with rule in FIG. 5 where unavailable attributes are removed. The corresponding constituent responses are joined and the (AND condition of) original filter 1110 is thereafter applied on the joined results, to obtain the final set of entries, as desired. The De Morgan law is applicable even in the below described scenario when at least one query attribute is available from multiple participants.

9. Pruned Filters

At Least One Query Attribute Stored on Multiple Participants

FIGS. 12-18 contain original filters with at least one AVA with a query attribute which is present in both data sources 180 and 190. Such AVAs are shown with an additional solid line enclosure in each of FIGS. 12-17.

Figures 12, 13:
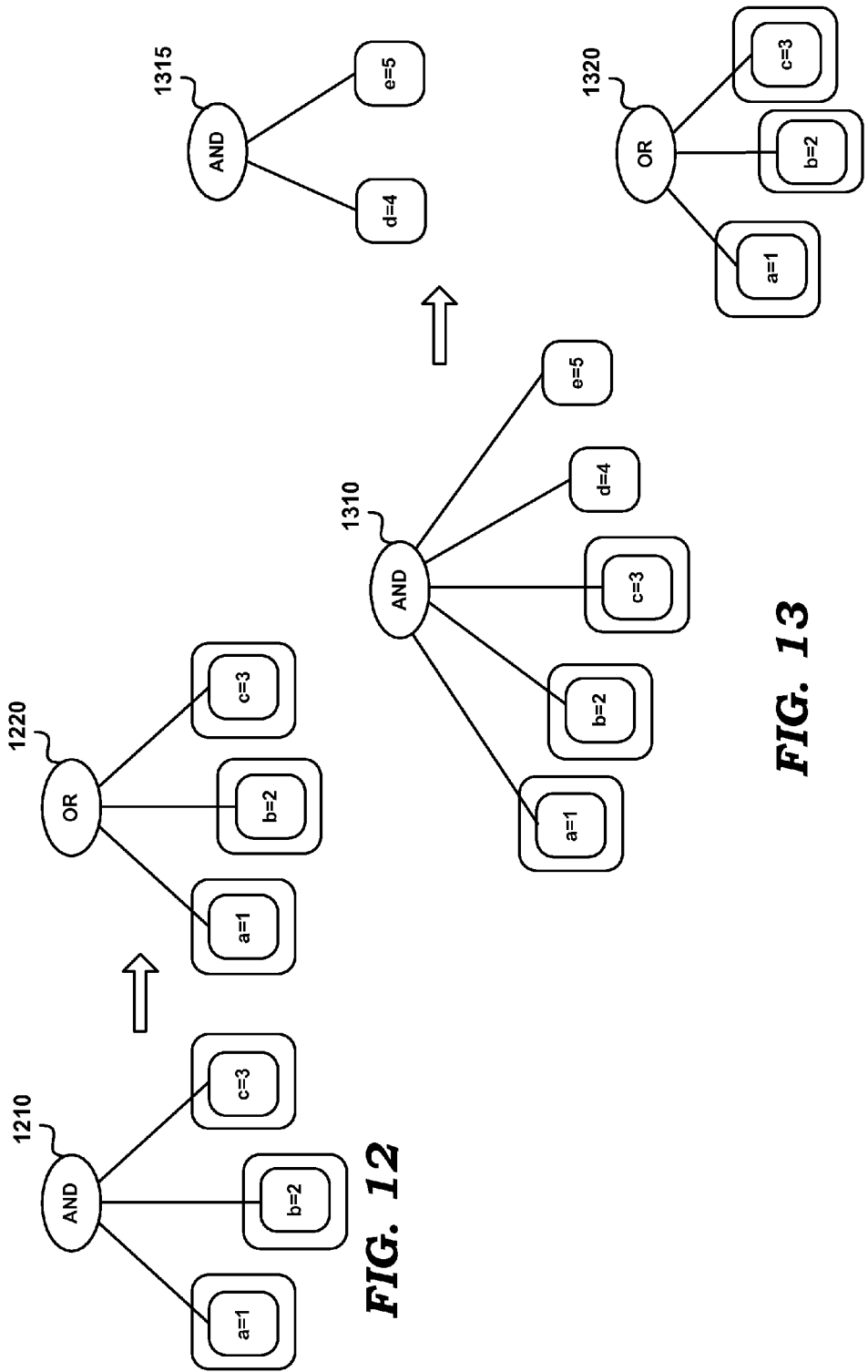

FIG. 12 depicts a directory request used to illustrate a general rule that if an original filter contains a logical AND condition with the query attributes of all AVAs are stored in both primary participant and secondary participant, the pruned filter for each participant is formed with all AVAs connected by an OR logical operator (in the place of AND filter of the original request).

1210 represents original filter in which an AND logical condition is present at the highest level (root) of hierarchy and with all AVAs containing query attributes that are present in both P1 and P2. Accordingly, 'a', 'b' and 'c' of the original filter are shown available in both participants P1 and P2.

The pruned filter shown in 1220 is sent to both P1 and P2 as the same rule is applicable for both P1 and P2. The corresponding constituent responses are joined, and the (AND condition of) original filter 1210 is thereafter applied on the joined results, to obtain the final set of entries, as desired.

FIG. 13 depicts a directory request used to illustrate a general rule that if an original filter contains a logical AND condition with at least one AVA of an AND node (at high level) is a PrimaryOnly Attribute (stored only in P1) with other AVAs that are stored in both primary participant and secondary participant, the pruned filter is formed to contain only those AVAs that are PrimaryOnly connected by an AND operator.

Original filter 1310 is shown containing attributes 'a', 'b' and 'c' being available in both participants P1 and P2 whereas attributes 'd' and 'e' are shown to be available only in P1.

The pruned filters sent to P1 and P2 are shown as 1315 and 1320 respectively. In particular, pruned filter 1315 is shown containing an AND of two AVAs shown to be available only in primary participant P1. On the other hand, pruned filter 1320 (sent to secondary P2) is shown to contain an OR of the three AVAs shown available in both primary and secondary, and is obtained in accordance with the principle illustrated with respect to FIG. 5 (wherein 'd' and 'e' are available only in P1 and not in P2 and hence removed) and FIG. 12 (wherein AND of 'a', 'b' & 'c' attributes present in both P1 and P2 is transformed to OR)

The corresponding constituent responses are joined, and the (AND condition of) original filter 1310 is thereafter applied on the joined results, to obtain the final set of entries, as desired.

Figure 14:
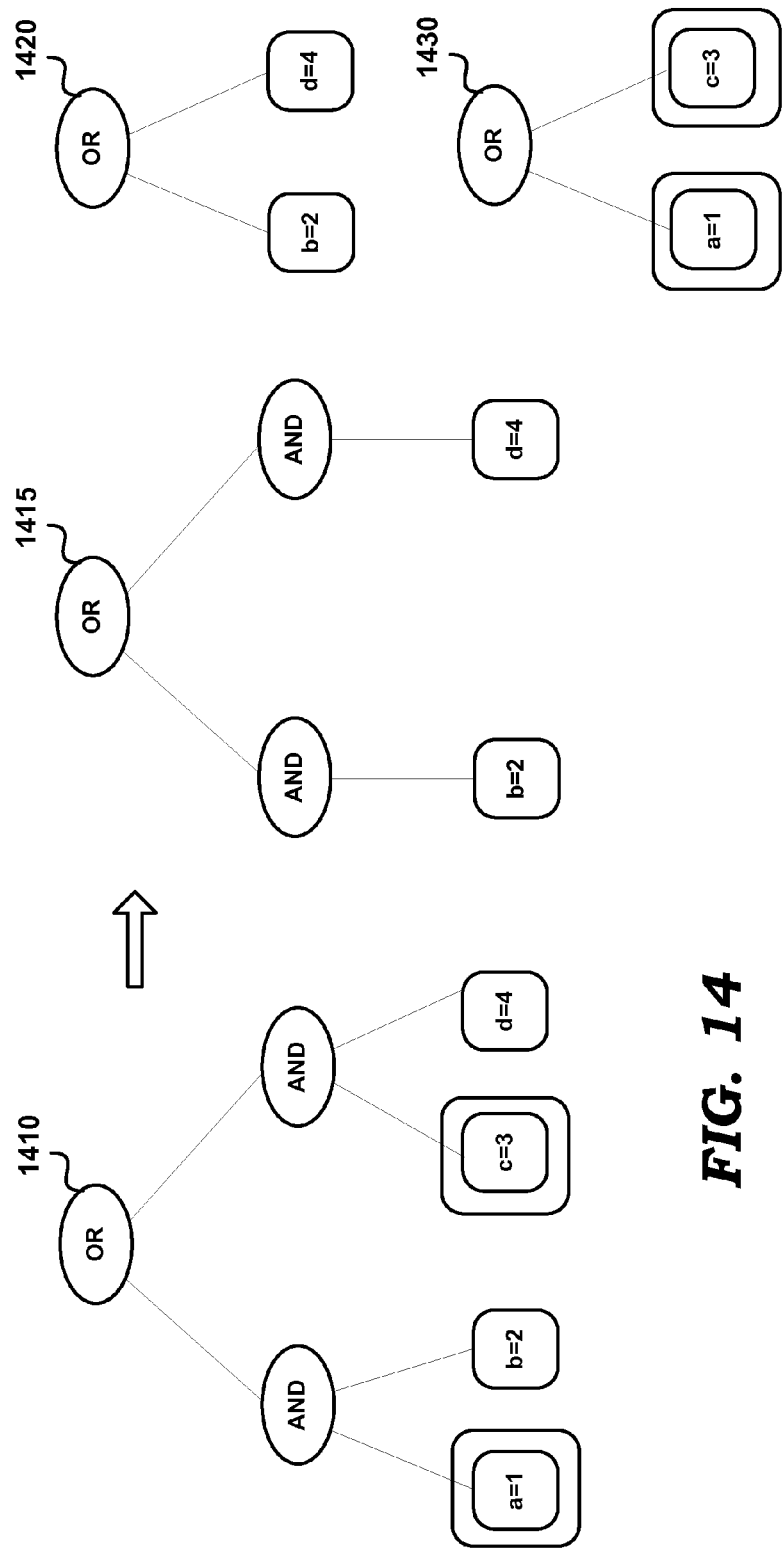

FIG. 14 depicts a directory request used to illustrate a general rule that the processing of an AND node is in accordance with the rules described above, even if an OR condition is present at a higher level.

Thus, the two AND nodes of original filter 1410 are pruned to remove the common attributes ('a' and 'c') (in accordance with the rule of FIG. 13), as shown in intermediate filter 1415. Intermediate filter 1415 is shown further processed to form pruned filter 1420, which is sent to primary participant P1. The rule of FIG. 6 (wherein attributes 'b' and 'd' present only in P1 are removed) would be operative in the construction of pruned filter for participant P2, with the intermediate filter also having AND nodes as a result and the final result being an OR of common attributes 'a' and 'c'.

It may be observed that pruned filter 1420 for P1 contains only those AVAs with search attributes present only in P1. Further, the AND logical condition of the original filter is replaced with an OR logical condition while forming the pruned filter thus expanding the scope of entries in constituent response. The pruned filter for P2 is shown as 1430.

FIG. 15 depicts a directory request used to illustrate a general rule that in case of an original filter with OR condition at a root/high level, if all AVAs belong to either PrimaryOnly or are common attributes, the pruned filter sent to the primary participant P1 is the same as the original filter. In other words, since all the attributes are present in the primary, the filter is sent as is to P1.

Original filter 1510 is shown with an OR logical condition at the highest level (root) of hierarchy, with query attribute 'a' shown as being available in both participants P1 and P2 whereas attributes 'b' and 'c' are shown to be available only in P1.

The pruned filters sent to P1 and P2 are shown as 1520 and 1540 respectively. Pruned filter 1520 sent to P1 is shown matching original filter 1510. Pruned filter 1540 is obtained in accordance with the principle illustrated in FIG. 7 (where in attributes 'b' and 'c' are present only in P1 and hence removed.) The corresponding constituent responses are joined, and the (OR condition of) original filter 1510 is thereafter applied on the joined results, to obtain the final set of entries, as desired.

FIG. 16 depicts a directory request used to illustrate a general rule that when AND node is the parent of OR node containing a shared attribute and at least one sibling of OR contains a PrimaryOnly attribute, then the pruned filter is formed by removing the complete OR component and retaining an AND of all PrimaryOnly AVAs.

Thus, original query 1610 is shown containing attributes 'c' and 'd' (siblings of OR) as being available only in primary participant P1, while attribute 'a' (child of OR) is shown as being a common attribute. Pruned filter 1615 sent to P1/primary is shown with the OR condition absent, and the AND condition contains only the attributes shown being available in primary participant P1. Pruned filter 1620 sent to secondary P2 is formed based on the rule illustrated with respect to FIG. 9 (wherein 'c' and 'd' attributes are present only in P1 and hence their AVAs are removed and AND node converted to OR node) and FIG. 7 (wherein attribute 'b' present only in P1 is removed) resulting in 1620.

Figure 17:
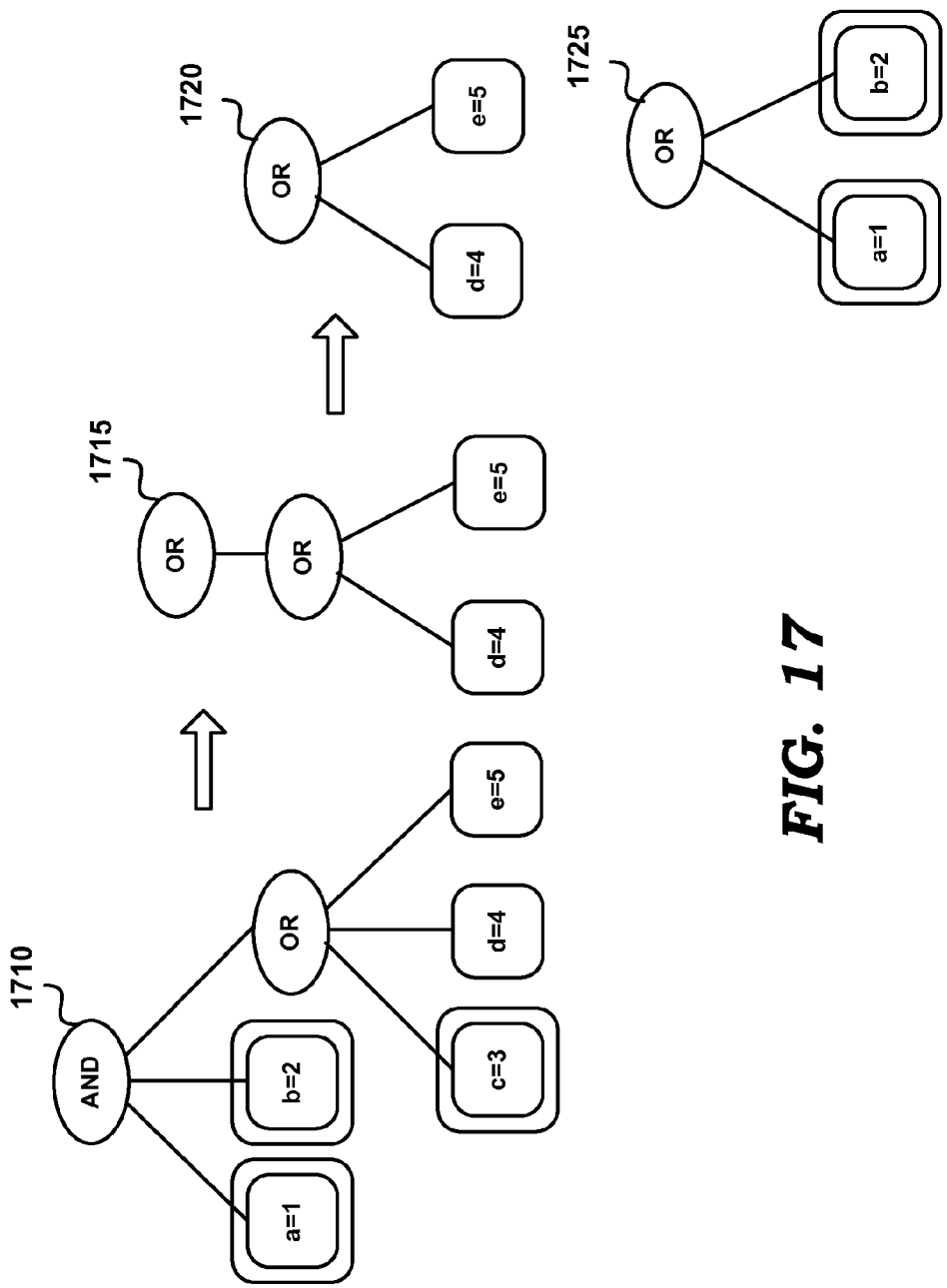

FIG. 17 depicts a directory request used to illustrate a general rule that when an AND node is the parent of OR node containing a set of shared attributes ('c' in original filter 1710) and if there is no sibling of OR which contains PrimaryOnly attribute ('a' and 'b' are not PrimaryOnly attributes, since shown as shared attributes), the pruned filter is formed by removing the shared attribute AVAs and changing the original AND node to an OR node.

Accordingly, intermediate filter 1715 is shown with AND (at root) replaced by OR. In addition, the AVA corresponding to the shared attribute 'c' is also shown removed (and thus absent). Pruned filter 1720 is formed by additional processing, and sent to P1. Pruned filter 1725 (with an OR condition at top) sent to participant P2 is formed by operation of the rule of FIG. 8 (wherein attributes 'a' and 'b' are siblings of OR which are present in P2 and hence the OR sub-tree is removed) and rule of FIG. 12 (wherein AND node is converted to OR node).

Figure 18:
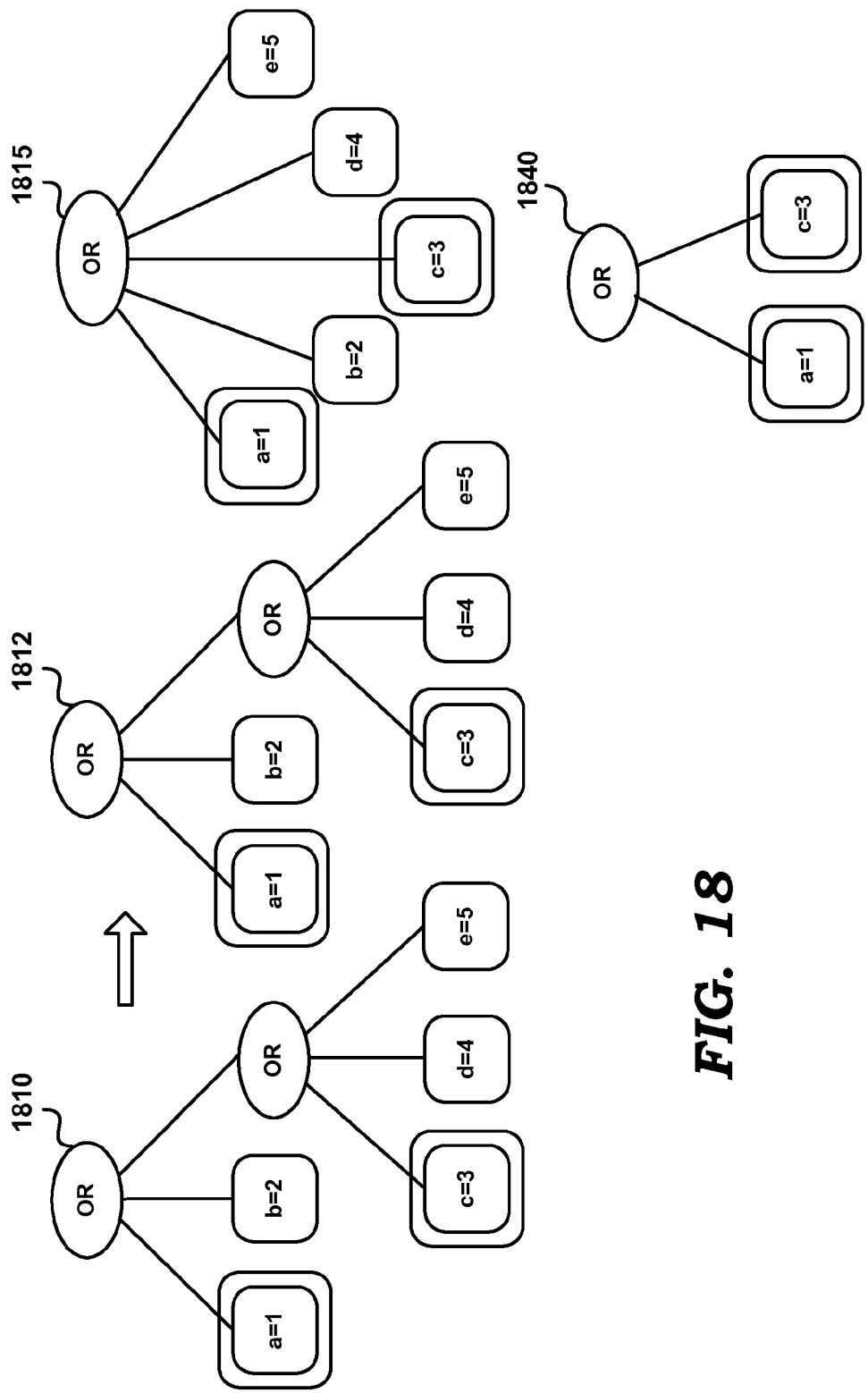

FIG. 18 depicts a directory request used to illustrate a general rule that the processing of an OR node is in accordance with the rule described associated with FIG. 15, even if an OR condition is present at a higher level. In this case, the attributes of all AVAs in child OR node belong to either PrimaryOnly ('d' and 'e') or common attributes ('c') and hence all AVAs in child OR node are retained based on rule in FIG. 15.

Applying the same rule to higher OR node, both attributes 'a' and 'b' are retained resulting in intermediate filter 1812. The two OR conditions of intermediate filter 1812 are merged to form pruned filter 1815 sent to P1. Pruned filter 1840 sent to secondary participant P2 is also shown which is derived after applying rule in FIG. 10 (wherein attributes 'b', 'd' and 'e' present only in P1 and hence are removed) and rule in FIG. 15 (wherein the OR of attributes 'a' and 'c' are retained).

10. Pruned Filters

Original Filter Containing Primary Only, Secondary Only and Common Attributes

In such cases, the rules corresponding to query attributes stored on only one participant are applied first (FIGS. 5-11) and then rules corresponding to query attributes stored on multiple participants (FIG. 12-18) are applied, in arriving at the corresponding pruned filters. Such an approach is illustrated when deriving the pruned filter for Participant P2 in FIG. 12-18.

11. Joining the Constituent Responses

Joining refers to forming of a (joined) entry from the various split entries stored across different data sources. The attribute(s) forming the basis for the join can be configured for each pair of data sources, such that the split entries corresponding to the same object can be readily identified and the joined entries created.

According to an aspect of the present disclosure, one of three joining policies may be employed (by result formation block 350) in forming joined entries from constituent responses. The three join policies 'Standard Join', 'Left Outer Join' and 'Full Outer Join' are described below in further detail.

The three join policies are further illustrated with an original filter of (|(title=*e*)(sn=*e*)) wherein 'sn' is configured in ds-cfg-participant-attribute of Primary (P1) and 'title' is configured in Secondary (P2) and requested attributes being 'cn', 'sn' and 'title', against the two participants of FIGS. 4A and 4B. As may be appreciated the pruned filter sent to primary participant of FIG. 4A is (sn=*e*), with the corresponding constituent response returning elements corresponding to objects/persons with respective 'cn' of Ronald, Sam and William. On the other hand, (title=*e*) is sent in the constituent query to the secondary participant of FIG. 4B, with the constituent response returning objects/persons with respective 'cn' of Ronald, Sam, Richard and Mike. The manner in which the results differ for the three join policies is described below.

A standard join returns all entries that satisfy the search filter in the primary participant by sending the pruned filter corresponding to P1 and joining the attributes contributed by secondary participants. The following result is obtained due to the standard join:

```
cn=Ronald,dc=oracle,dc=com
sn=Anne
cn=Ronald
title=Manager
cn=Sam,dc=oracle,dc=com
sn=Ketty
cn=Sam
title=SMTS
cn=William,dc=oracle,dc=com
sn=Tent
cn=William
```

The entries in the final search result thus are only those entries having matched the pruned filter sent to the primary participant and subsequently matching the original filter. The operation in accordance with Standard Join policy, is illustrated in further detail by the pseudo-code of Appendix A.

It may be appreciated that the pruned filters are not sent to all the participants in case of standard join, even though the principles of formation of the filters is explained for both primary and secondary participants. In general, given that only those entries present in the primary participant are eventually contained in the search result, and with the goals of avoiding retrieval of unneeded entries from the participants and/or to reduce the join overhead in VDS 150, the following heuristics may be employed:

1. If a (configured) primary is one of participants, start from primary (or determine appropriate participant as a primary) by sending the corresponding pruned filter.

2. If a pruned filter contains non-generic filters containing specific attributes (like cn=kgopalan) etc., such that only a small set of entries may match the search criteria which will be used for subsequent join processing, it is given higher priority than generic filters like "cn=*" or filters containing generic attributes like "objectclass=person" (since more specific filters eliminate unsuitable entries early on in processing sequence). In certain cases, starting with this type of specific filter, may ensure formation of the search result with minimal overhead.

3. If the pruned filter of any of the participants contains an Equality filter for any attribute excluding "objectclass" attribute, start from that participant. Since 'objectclass' attribute is part of all the entries in LDAP, filter like "objectclass=*" or "objectclass=person" would match all the entries in LDAP or entries that represent a person object respectively. Hence, filter with "objectclass" attribute should be given least priority so that all or large number of entries are not retrieved from the data source.

4. If the pruned filter contains AND component, it is given higher priority than the pruned filters containing OR component (again since AND-based filters eliminate unsuitable entries early on, compared to OR-based filters).

5. If the pruned filter of any of the participants contains comparison AVA like "<", ">" etc., for any attribute excluding "objectclass" attribute, that participant gets the next higher priority as per this heuristics.

6. If the pruned filter of any of the participants contains Substring/wildcard filters for any attribute, that participant should be given a lower priority as per this heuristics as the goal is to retrieve only those candidate entries (from the corresponding data source) that are closest to the entries (final set of entries in the search result) being returned for the original filter and not retrieving large number of entries which would be discarded in subsequent processing as it doesn't match the original filter.

7. If the pruned filter of any of the participants contains Presence filters for any attribute, that participant should be given the lowest priority as per this heuristics, as a Presence filter would retrieve all the entries in which the attribute is present. For example, a filter like "cn=*" would retrieve all entries that contain "cn" attribute with any value.

Turning to the next join policy, the Left Outer Join returns all the entries as in Standard Join by sending the pruned filter corresponding to P1, in addition to the entries from the secondary participants that satisfy the join criteria and which have a corresponding match with an entry in primary participant by sending the pruned filter corresponding to P2. The corresponding result for the illustrative query of above, is shown below:

```
cn=Ronald,dc=oracle,dc=com
sn=Anne
cn=Ronald
title=Manager
cn=Sam,dc=oracle,dc=com
sn=Ketty
cn=Sam
title=SMTS
cn=William,dc=oracle,dc=com
sn=Tent
cn=William
cn=Richard,dc=oracle,dc=com
sn=Rod
cn=Richard
title=Trainee
```

In particular, Richard represents an object from the secondary participant, having a corresponding split entry in the primary source (but which did not match the constituent query sent to primary). The operation in accordance with Left Outer Join policy, is illustrated in further detail by the pseudo-code of Appendix B.

Full Outer Join returns entries as in the Left Outer Join, in addition to the entries from the secondary participants that satisfy the corresponding pruned filter, even if such entries do not have a matching entry in primary participant. The corresponding result for the illustrative query of above, is shown below:

```
cn=Ronald,dc=oracle,dc=com
sn=Anne
cn=Ronald
title=Manager
cn=Sam,dc=oracle,dc=com
sn=Ketty
cn=Sam
title=SMTS
cn=William,dc=oracle,dc=com
sn=Tent
cn=William
cn=Richard,dc=oracle,dc=com
sn=Rod
cn=Richard
title=Trainee
cn=Mike,dc=oracle,dc=com
sn=Ret
cn=Mike
title=MTS - dept_sec
```

In particular, Mike represents an object received from the secondary participant (in the constituent response), but without having a corresponding split entry in the primary. The operation in accordance with Full Outer Join policy is illustrated in further detail by the pseudo-code of Appendix C. Thus, in case of Left Outer Join and Full Outer Join, the respective pruned filters may be sent to each of the participants, and processed to form the final search result for each directory request.

It should be appreciated that the features described above can be implemented in various embodiments as a desired combination of one or more of hardware, executable modules, and firmware. The description is continued with respect to an embodiment in which various features are operative when executable modules are executed.

12. Digital Processing System

FIG. 19 is a block diagram illustrating the details of digital processing system 1900 in which various aspects of the present disclosure are operative by execution of appropriate software instructions. Digital processing system 1900 may correspond to VDS 150 (or any other system in which the various features disclosed above can be implemented).

Digital processing system 1900 may contain one or more processors such as a central processing unit (CPU) 1910, random access memory (RAM) 1920, secondary memory 1930, graphics controller 1960, display unit 1970, network interface 1980, and input interface 1990. All the components except display unit 1970 may communicate with each other over communication path 1950, which may contain several buses as is well known in the relevant arts. The components of FIG. 19 are described below in further detail.

CPU 1910 may execute instructions stored in RAM 1920 to provide several features of the present disclosure (e.g., those of the flowchart of FIG. 2, as illustrated with examples thereafter as well). CPU 1910 may contain multiple processing units, with each processing unit potentially being designed for a specific task. Alternatively, CPU 1910 may contain only a single general-purpose processing unit.

RAM 1920 may receive instructions from secondary memory 1930 using communication path 1950. RAM 1920 is shown currently containing software instructions constituting shared environment 1925 and/or user programs 1926. Shared environment 1925 includes operating systems, device drivers, virtual machines, etc., which provide a (common) run time environment for execution of user programs 1926.

Graphics controller 1960 generates display signals (e.g., in RGB format) to display unit 1970 based on data/instructions received from CPU 1910. Display unit 1970 contains a display screen to display the images defined by the display signals. Input interface 1990 may correspond to a keyboard and a pointing device (e.g., touch-pad, mouse) and may be used to provide inputs. Network interface 1980 provides connectivity to a network (e.g., using Internet Protocol), and may be used to communicate with other systems (such as those shown in FIG. 1) connected to the network.

Secondary memory 1930 may contain hard drive 1935, flash memory 1936, and removable storage drive 1937. Secondary memory 1930 may store the data software instructions (e.g., for performing the actions noted above with respect to FIG. 2), which enable digital processing system 1900 to provide several features in accordance with the present disclosure.

Some or all of the data and instructions may be provided on removable storage unit 1940, and the data and instructions may be read and provided by removable storage drive 1937 to CPU 1910. Floppy drive, magnetic tape drive, CD-ROM drive, DVD Drive, Flash memory, removable memory chip (PCMCIA Card, EEPROM) are examples of such removable storage drive 1937.

Removable storage unit 1940 may be implemented using medium and storage format compatible with removable storage drive 1937 such that removable storage drive 1937 can read the data and instructions. Thus, removable storage unit 1940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1940 or hard disk installed in hard drive 1935. These computer program products are means for providing software to digital processing system 1900. CPU 1910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1930. Volatile media includes dynamic memory, such as RAM 1920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, directory requests, hardware modules, hardware circuits, hardware chips, etc., to provide a thorough understanding of embodiments of the disclosure.

13. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX A

Standard Join

```
If (incoming search is a base search) //No need for filter pruning process
{
    Change the filter to (objectclass=*) and send it to Primary participant.
    Follow the normal search flow, where the result from Primary is joined with other
participants.
    Finally evaluate the original search filter, scope and search base again.
    If (evaluation successful)
        Return the joined entry
    Else
        Do not return the entry.
}
Else
{
Prune the incoming search filter against all the participants. (Each participant returns the
pruned filter to be executed against it. If no pruned filter can be possibly obtained, the
participant returns null.)
If {Search filter has at least one attribute configured in "ds-cfg-participant-attribute" of
primary}
{
    Send the appropriate pruned filter to Primary only
    Join the entries returned from Primary with other secondary participants
    Return the joined entries
}
Else     //All the attributes in search filter are in secondary participants
{
    For (each eligible secondary participant ordered based on the heuristics of pruned filter)
    {
        Send appropriate pruned filters to secondary with that participant suffix as the
search base and scope as "sub".
        If (NO_SUCH_OBJECT result code or no entries returned)
            Continue to the next iteration of this loop.
        For (each entry returned)
        {
            See if there is a corresponding entry in primary //either using direct join
criteria if one is present, otherwise using multiple hops to reach primary
            If (no primary entry)
                Do not return the entry
            Else
            {
                Join the entry with all participants. That is, this secondary is now
treated as the Primary and a Join is done.
                Evaluate the original search filter, original search base and
original search scope again before returning the joined entry.
                If (Evaluation is successful)
                {
                    Set the entry DN to the primary entry DN with Join suffix.
                    If (duplicate entry DN)
                        Do not return the joined entry.
                    Else
                        Return the joined entry
                }
                Else
                    Do not return the joined entry.
            }
        }
    }
}
}
```

APPENDIX B

Left Outer Join

```
If (incoming search is a base search) //No need for filter pruning process
{
    Change the filter to (objectclass=*) and send it to Primary participant.
    Follow the normal search flow, where the result from Primary is joined with other
participants.
    Finally evaluate the original search filter, scope and search base again.
    If (evaluation successful)
        Return the joined entry
    Else
        Do not return the entry.
}
Else
{
    Prune the incoming search filter against all the participants. (Each participant returns
    the pruned filter to be executed against it. If no pruned filter can be possibly obtained,
    the participant returns null.)
    Send the appropriate pruned filter to Primary
    Join the entries returned from Primary with other secondary participants
    Return the joined entries
    For (each eligible secondary participant ordered based on the heuristics of pruned filter)
    {
        Send appropriate pruned filters to secondary with that participant suffix as the
        search base and scope as "sub".
        If (NO_SUCH_OBJECT result code or no entries returned)
            Continue to the next iteration of this loop.
        For (each entry returned)
        {
            See if there is a corresponding entry in primary //either using direct join
        criteria if one is present, otherwise using multiple hops to reach primary
            If (no primary entry)
                Do not return the entry
            Else
            {
                Join the entry with all participants. That is, this secondary is now
            treated as the Primary and a Join is done.
                Evaluate the original search filter, original search base and
            original search scope again before returning the joined entry.
                If (Evaluation is successful)
                {
                    Set the entry DN to the primary entry DN with Join suffix.
                    If (duplicate entry DN)
                        Do not return the joined entry.
                    Else
                        Return the joined entry
                }
                Else
                    Do not return the joined entry.
            }
        }
    }
}
```

APPENDIX C

Full Outer Join

```
If (incoming search is a base search) //No need for filter pruning process
{
    Change the filter to (objectclass=*) and send it to each participant which has been
configured for the actual filter attributes.
    Follow the normal search flow, where the result from each participant is joined with
other participants.
    Finally evaluate the original search filter, scope and search base again.
    If (evaluation successful)
        Return the joined entry
    Else
        Do not return the entry.
}
Else
{
    Prune the incoming search filter against all the participants. (Each participant returns
    the pruned filter to be executed against it. If no pruned filter can be possibly obtained,
    the participant returns null.)
```

APPENDIX C-continued

Full Outer Join

```
    Send the appropriate pruned filter to Primary
    Join the entries returned from Primary with other secondary participants
    Return the joined entries
For (each eligible secondary participant ordered based on the heuristics of pruned filter)
{
    Send appropriate pruned filters to secondary with that participant suffix as the
search base and scope as "sub".
    If (NO_SUCH_OBJECT result code or no entries returned)
        Continue to the next iteration of this loop.
    For (each entry returned)
    {
        Join the entry with all participants. That is, this secondary is now treated
    as the Primary and a Join is done.
        Evaluate the original search filter, original search base and original
    search scope again before returning the joined entry.
        If (Evaluation is successful)
        {
            Set the entry DN to the primary entry DN with Join suffix if
        primary entry exists. Else, retain the secondary DN with join suffix.
            If (duplicate entry DN)
                Do not return the joined entry.
            Else
                Return the joined entry
        }
        Else
            Do not return the joined entry.
    }
  }
}
```

What is claimed is:

1. A method of processing requests in a virtual directory server (VDS), said method comprising:

maintaining attribute data identifying a corresponding set of stored attributes associated with each data source of a plurality of data sources, each data source storing values for associated set of stored attributes;

receiving a first request containing an original filter, said original filter being based on a plurality of query attributes, wherein said original filter contains a plurality of attribute value assertions (AVAs), each AVA being based on one attribute of said plurality of query attributes;

identifying, based on said attribute data, a set of data sources of said plurality of data sources, wherein each of said set of data sources stores values for at least one of said plurality of query attributes, wherein said set of data sources contain multiple data sources, wherein said attribute data associates a first set of query attributes of said plurality of query attributes with a first data source, and a second set of query attributes of said plurality of query attributes with a second data source;

forming a plurality of constituent requests, with each constituent request having a corresponding pruned filter suitable for a respective data source of said set of data sources, wherein the pruned filter of each constituent request for said first data source and said second data source respectively contains only said first set of query attributes and said second set of attributes, wherein said original filter contains at least one attribute that is not contained in one of said first set of query attributes and said second set of query attributes;

sending each constituent request of said plurality of constituent requests to the corresponding data source of said set of data sources;

receiving a corresponding constituent response of a plurality of constituent responses from each of said set of data sources;

forming a final response based on said plurality of constituent responses and said first request; and sending said final response to a client system from which said first request is received.

2. The method of claim 1, wherein each query attribute of said original filter is contained in only one of said plurality of data sources, wherein said original filter comprises an AND logical operator of a first set of AVAs of said plurality of AVAs, wherein said pruned filter for said first data source comprises said AND logical operator of only those of said first set of AVAs having respective query attributes in said first set of query attributes such that AVAs having attributes in said second set of query attributes are absent in said pruned filter.

3. The method of claim 2, wherein said original filter comprises an OR logical operator of a second set of AVAs and a node formed as said AND logical operator of said first set of AVAs, each query attribute of said first set of AVAs and said second set of AVAs being contained in said plurality of attributes, wherein said pruned filter for said first data source comprises said OR logical operator of said second set of AVAs and said AND logical operator of only those of first set of AVAs having respective query attributes in said first set of query attributes.

4. The method of claim 1, wherein each query attribute of said original filter is contained in only one of said plurality of data sources, wherein said original filter comprises an OR logical operator of a set of AVAs of said plurality of AVAs, wherein said pruned filter for said first data source comprises said OR logical operator of only those of said set of AVAs having respective query attributes in said first set of query attributes such that AVAs having attributes in said second set of query attributes are absent in said pruned filter.

5. The method of claim 1, wherein each query attribute of said original filter is contained in only one of said plurality of data sources,
  wherein said original filter comprises an AND logical operator of a first set of AVAs of said plurality of AVAs and a node formed as an OR logical operator of a second set of AVAs of said plurality of AVAs,
  wherein said first set of AVAs contain a third set of AVAs, each having a query attribute of said first set of query attributes,
  wherein said pruned filter for said first data source comprises said AND logical operator of only said third set of AVAs such that said OR node and those AVAs having attributes of said second set of query attributes are absent in said pruned filter for said first data source.

6. The method of claim 1, wherein each query attribute of said original filter is contained in only one of said plurality of data sources,
  wherein said original filter comprises an AND logical operator of a first set of AVAs of said plurality of AVAs and a node formed as an OR logical operator of a second set of AVAs of said plurality of AVAs,
  wherein none of said first set of AVAs contain a query attribute of said first set of query attributes,
  wherein said pruned filter for said first data source contains only said OR logical operator of only those of said second set of AVAs having query attributes of said first set of query attributes.

7. The method of claim 1, wherein each query attribute of said original filter is contained in only one of said plurality of data sources,
  wherein said original filter comprises an OR logical operator of a first set of AVAs of said plurality of AVAs and a node formed as said OR logical operator of a second set of AVAs of said plurality of AVAs,
  wherein said pruned filter for said first data source is formed as said OR logical operator of each of said first set of AVAs and said each of second set of AVAs that has query attributes of said first set of query attributes.

8. The method of claim 1, wherein each query attribute of said original filter is contained in only one of said plurality of data sources,
  wherein a first node at a higher level of said original filter comprises a NOT logical operator,
  wherein said forming eliminates said NOT logical operator from said original filter in accordance with De-Morgan's law and processes the resulting filter to determine said pruned filters.

9. The method of claim 1, wherein said original filter comprises an AND logical operator of a first set of AVAs of said plurality of AVAs,
  wherein each query attribute of all of said first set of AVAs is present in both of said first set of query attributes and said second set of query attributes,
  wherein said pruned filter for said first data source comprises an OR logical operator of said first set of AVAs.

10. The method of claim 1, wherein said original filter comprises an AND logical operator of a first set of AVAs of said plurality of AVAs,
  wherein said first set of AVAs comprise a second set of AVAs, each of said second set of AVAs having a query attribute of only said first set of query attributes, but not said second set of query attributes,
  wherein the remaining AVAs of said first set of AVAs, other than said second set of AVAs, have query attributes present in both of said first set of query attributes and said second set of query attributes,
  wherein said pruned filter for said first data source comprises said AND logical operator of only said second set of AVAs.

11. The method of claim 10, wherein said AND logical operator is a child node of another OR node.

12. The method of claim 1, wherein said original filter comprises an OR logical operator of a first set of AVAs of said plurality of AVAs,
  wherein the query attribute of some of said first set of AVAs is present in both of said first set of query attributes and said second set of query attributes, and wherein the query attribute of the remaining ones of said first of AVAs is present only in said first set of query attributes,
  wherein said pruned filter for said first data source comprises an OR logical operator of all of said first set of AVAs.

13. The method of claim 12, wherein said OR logical operator is a child node of another OR node.

14. The method of claim 1, wherein said original filter comprises an AND logical operator of a first set of AVAs of said plurality of AVAs and a node formed as an OR logical operator of a second set of AVAs of said plurality of AVAs,
  wherein said first set of AVAs contain at least one AVA having a query attribute in only said first set of query attributes, but not said second set of query attributes,
  wherein said second set of AVAs contain at least another AVA having a query attribute in both of said first set of query attributes and said second set of query attributes,
  wherein said pruned filter for said first data source contains only said AND logical operator of only those of said first set of AVAs having query attributes in only said first set of query attributes, but not said OR node and those AVAs having attributes of said second set of query attributes.

15. The method of claim 1, wherein said original filter comprises an AND logical operator of a first set of AVAs of said plurality of AVAs and a node formed as an OR logical operator of a second set of AVAs of said plurality of AVAs,
  wherein each of said first set of AVAs has a query attribute contained in both of said first set of query attributes and said second set of query attributes,
  wherein said second set of AVAs contain at least one AVA having a query attribute contained in both of said first set of query attributes and said second set of query attributes,
  wherein said pruned filter is formed by
  removing each AVA of said first set of AVAs and said second set of AVAs having a query attribute contained in both of said first set of query attributes and said second set of query attributes; and
  replacing said AND logical operator with said OR logical operator.

16. A non-transitory machine readable medium storing one or more sequences of instructions for causing virtual directory server (VDS) to process directory requests, said VDS containing one or more processors, wherein execution of said one or more sequences of instructions by said one or more processors causes said VDS to perform the actions of:
  maintaining attribute data identifying a corresponding set of stored attributes associated with each data source of a plurality of data sources, each data source storing values for associated set of stored attributes;
  receiving a first request having an original filter, said original filter containing a plurality of attribute value assertions (AVAs), with each AVA having a corresponding stored attribute to specify a respective condition;

identifying, based on said attribute data, a set of data sources of said plurality of data sources, wherein each of said set of data sources stores values for at least one of said plurality of query attributes, wherein said set of data sources contain multiple data sources;

forming a first constituent request for a first data source of said set of data sources, said constituent request containing a first pruned filter, wherein said plurality of AVAs containing at least one AVA that is not contained in said first pruned filter;

sending said first constituent request to said first data source and receiving a first constituent response from said first data source, wherein said first constituent response contains a set of split entries;

retrieving a set of attributes from each of said set of data sources, other than said first data source, in response to each data source being identified as storing values for query attributes; and joining each of said set of split entries with corresponding attributes of said set of attributes to form joined entries, wherein at least one joined entry is sent as a part of a search result.

17. The machine readable medium of claim 16, wherein said joining is a according to a standard join policy.

18. The machine readable medium of claim 16, wherein said joining is according to either a left outer join policy or a full outer join policy, wherein said forming forms a corresponding constituent request for each of said set of data sources, with each constituent request containing a corresponding pruned filter, wherein said retrieving comprises sending each of the constituent requests to corresponding data source.

19. A computing system comprising:

a plurality of data sources together storing entries related to objects, said entries being stored as split entries across respective data sources;

a first system to send a directory request containing an original filter, said original filter containing a plurality of attribute value assertions (AVAs), each AVA containing a query attribute; and a virtual directory server (VDS) containing at least one processor and at least one memory, wherein said at least one processor retrieves and executes instructions stored in said at least one memory to cause said VDS to be operable to:

maintain attribute data identifying a corresponding set of stored attributes associated with each data source of said plurality of data sources, each data source storing values for associated set of stored attributes;

receive said directory request;

generate a constituent request, said constituent request containing a first pruned filter, wherein said pruned filter contains only those query attributes indicated as being stored in a first data source of said plurality of data sources, said original filter containing an AVA with a first query attribute that is not contained in said first pruned filter;

send said constituent request to a first data source of said plurality of data sources;

receive a first constituent response from said first data source, wherein said first constituent response contains a set of split entries;

retrieve a set of attributes from each of said set of data sources, other than said first data source, in response to each data source being identified as storing values for corresponding query attributes;

join each of said set of split entries with corresponding attributes of said set of attributes to form joined entries; and send said joined entries to said first system as a search result.

* * * * *

UNITED STATES PATENT AND TRADEMARK OFFICE
CERTIFICATE OF CORRECTION

| | | |
|---|---|---|
| PATENT NO. | : 9,569,507 B2 | Page 1 of 1 |
| APPLICATION NO. | : 14/067984 | |
| DATED | : February 14, 2017 | |
| INVENTOR(S) | : Gopalan et al. | |

It is certified that error appears in the above-identified patent and that said Letters Patent is hereby corrected as shown below:

In the Specification

In Column 1, Line 56, after "implemented" insert -- . --.

In Column 12, Line 51, after "OR)" insert -- . --.

Signed and Sealed this
Second Day of January, 2018

Joseph Matal
*Performing the Functions and Duties of the*
*Under Secretary of Commerce for Intellectual Property and*
*Director of the United States Patent and Trademark Office*